(12) United States Patent
Newell

(10) Patent No.: US 11,837,065 B2
(45) Date of Patent: *Dec. 5, 2023

(54) SYSTEMS AND METHODS FOR TEXTURAL ZONE MONITORING

(71) Applicant: BI Incorporated, Boulder, CO (US)

(72) Inventor: Joseph P. Newell, Louisville, CO (US)

(73) Assignee: BI Incorporated, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,453

(22) Filed: Jan. 25, 2022

(65) Prior Publication Data
US 2022/0146616 A1 May 12, 2022

Related U.S. Application Data

(63) Continuation of application No. 16/878,302, filed on May 19, 2020, now Pat. No. 11,270,564, which is a continuation of application No. 16/359,942, filed on Mar. 20, 2019, now Pat. No. 10,692,345.

(51) Int. Cl.
| | | |
|---|---|---|
| *G08B 21/02* | (2006.01) | |
| *H04W 4/029* | (2018.01) | |
| *G01S 1/02* | (2010.01) | |
| *G01S 5/02* | (2010.01) | |
| *G01S 19/01* | (2010.01) | |
| *G01S 19/00* | (2010.01) | |

(52) U.S. Cl.
CPC ......... *G08B 21/0261* (2013.01); *G01S 1/022* (2013.01); *G01S 5/0226* (2013.01); *G01S 5/0284* (2013.01); *G01S 19/00* (2013.01); *G08B 21/028* (2013.01); *G08B 21/0269* (2013.01); *H04W 4/029* (2018.02); *G01S 2201/025* (2019.08)

(58) Field of Classification Search
None
See application file for complete search history.

(56) References Cited

U.S. PATENT DOCUMENTS

| | | | |
|---|---|---|---|
| 6,317,685 B1 | 11/2001 | Kozak et al. | |
| 7,930,927 B2 | 4/2011 | Cooper et al. | |
| 8,068,696 B2 | 11/2011 | Crombez | |
| 8,451,131 B2 * | 5/2013 | Ghazarian .......... | G08B 21/0258 340/539.11 |
| 8,493,219 B2 * | 7/2013 | Buck .................. | G08B 21/22 455/456.1 |
| 8,569,952 B2 | 10/2013 | Genz | |
| 8,576,065 B2 * | 11/2013 | Buck .................. | G08B 21/0283 340/435 |
| 8,624,727 B2 * | 1/2014 | Saigh .................. | A61K 31/045 340/541 |
| 8,629,776 B2 | 1/2014 | Buck | |
| 8,657,744 B2 | 2/2014 | Rompa | |
| 8,666,119 B1 | 3/2014 | Mallet | |

(Continued)

FOREIGN PATENT DOCUMENTS

JP 2005501456 A * 1/2005

*Primary Examiner* — Fekadeselassie Girma
(74) *Attorney, Agent, or Firm* — Osha Bergman Watanabe & Burton LLP

(57) ABSTRACT

Various embodiments of the present invention provide systems and method for monitoring of physical movement in relation to regions where movement is either unconditionally or conditionally unauthorized.

22 Claims, 12 Drawing Sheets

(56) References Cited

U.S. PATENT DOCUMENTS

| | | |
|---|---|---|
| 9,197,595 B1 | 11/2015 | Sandler |
| 9,240,118 B2 | 1/2016 | Melton |
| 9,241,659 B2 | 1/2016 | Rompa |
| 9,355,548 B2 | 5/2016 | Buck |
| 9,355,579 B2 | 5/2016 | Buck |
| 9,423,487 B2 | 8/2016 | Buck |
| 9,480,431 B2 | 11/2016 | Melton |
| 9,626,855 B2 | 4/2017 | Melton |
| 9,629,420 B2 | 4/2017 | Cooper |
| 9,668,095 B1 | 5/2017 | Newell |
| 10,068,462 B2 | 3/2018 | Buck et al. |
| 9,989,649 B2 * | 6/2018 | Buck, Jr. ............... G01S 19/48 |
| 10,077,261 B2 | 9/2018 | Connolly et al. |
| 10,225,522 B1 | 3/2019 | Kusens |
| 10,242,484 B1 | 3/2019 | Cernigliano |
| 10,382,890 B1 | 8/2019 | Stirling |
| 10,497,883 B2 | 12/2019 | Adachi et al. |
| 2002/0141637 A1 | 10/2002 | Brodsky |
| 2007/0247422 A1 | 10/2007 | Vertegaal |
| 2008/0186165 A1 * | 8/2008 | Bertagna ............ G08B 21/0227 340/670 |
| 2008/0291011 A1 * | 11/2008 | Knight ............... G08B 21/0252 340/539.13 |
| 2009/0191840 A1 * | 7/2009 | Piett ..................... H04W 4/029 455/404.1 |
| 2009/0191842 A1 * | 7/2009 | Piett ...................... H04L 63/30 455/404.2 |
| 2009/0222776 A1 | 9/2009 | Meers |
| 2010/0118149 A1 | 5/2010 | Levin |
| 2011/0154884 A1 | 6/2011 | Cooper |
| 2012/0300020 A1 | 11/2012 | Arth |
| 2013/0063418 A1 | 3/2013 | Kaschalk |
| 2014/0258201 A1 * | 9/2014 | Finlow-Bates ......... G01S 19/42 706/46 |
| 2014/0285619 A1 | 9/2014 | Acquavella |
| 2014/0285624 A1 | 9/2014 | Acquavella |
| 2015/0088452 A1 * | 3/2015 | Troxler ............... G08B 21/023 702/150 |
| 2015/0307119 A1 | 10/2015 | Ghaly |
| 2015/0338117 A1 | 11/2015 | Henneberger |
| 2016/0241776 A1 | 8/2016 | Kim |
| 2017/0059328 A1 | 3/2017 | Dousse |
| 2017/0102467 A1 | 4/2017 | Nielsen |
| 2017/0113707 A1 | 4/2017 | Ghaly |
| 2017/0119298 A1 | 5/2017 | Cheung |
| 2017/0300058 A1 * | 10/2017 | Peret .................... G05D 1/0246 |
| 2017/0329019 A1 | 11/2017 | croyle |
| 2018/0167783 A1 * | 6/2018 | Khoche ..................... C09J 7/38 |
| 2018/0181888 A1 | 6/2018 | Ihara |
| 2019/0087145 A1 | 3/2019 | Park |
| 2019/0124476 A1 * | 4/2019 | Blaha, Jr. ............... H04W 4/33 |
| 2019/0143996 A1 | 5/2019 | Fawaz |
| 2019/0172008 A1 | 6/2019 | Hage |
| 2019/0204099 A1 | 7/2019 | Buck et al. |
| 2019/0204903 A1 | 7/2019 | Buck et al. |
| 2019/0206221 A1 | 7/2019 | Buck et al. |
| 2019/0206222 A1 | 7/2019 | Buck et al. |
| 2019/0206229 A1 | 7/2019 | Buck et al. |
| 2019/0208355 A1 * | 7/2019 | Buck, Jr. ............. H04W 52/028 |
| 2019/0265222 A1 * | 8/2019 | Troxler .................... G01N 9/00 |
| 2019/0266390 A1 | 8/2019 | Gusarov |
| 2019/0289552 A1 | 9/2019 | Jain |
| 2019/0328549 A1 | 10/2019 | Van der Walt |
| 2022/0061680 A1 * | 3/2022 | Hanson ................ G08B 21/22 |
| 2022/0086598 A1 * | 3/2022 | Pettit .................... H04W 12/80 |

* cited by examiner

SYSTEMS AND METHODS FOR TEXTURAL ZONE MONITORING

CROSS REFERENCE TO RELATED APPLICATION

The present application is a continuation of U.S. patent application Ser. No. 16/878,302 entitled "Systems and Methods for Textural Zone Monitoring", and filed May 19, 2020 by Newell; which in turn is a continuation of U.S. Pat. No. 10,692,345 entitled "Systems and Methods for Textural Zone Monitoring", and issued Jun. 23, 2020 by Newell. The entirety of both of the aforementioned references is incorporated herein by reference for all purposes.

BACKGROUND OF THE INVENTION

Various embodiments of the present invention provide systems and method for monitoring of physical movement in relation to regions where movement is either unconditionally or conditionally unauthorized.

Large numbers of individuals are currently housed in prisons. This represents a significant cost to society both in terms of housing expense and wasted productivity. To address this concern, house arrest systems have been developed for use by lower risk offenders. This allows the lower risk offender to be monitored outside of a traditional prison system and allows the offender an opportunity to work and interact to at least some degree in society. The same approach is applied to paroled prisoners allowing for a monitored transition between a prison atmosphere and returning to society. In some cases, it may be desirable to limit the movement of monitored individuals to areas that do not exhibit hazards to the individual trying to reintroduce himself back into society, or to control areas where an individual is allowed to move while still allowing the individual to work, shop, and engage in some level of healthy recreation.

Thus, for at least the aforementioned reasons, there exists a need in the art for more advanced approaches, devices and systems for monitoring.

BRIEF SUMMARY OF THE INVENTION

Various embodiments of the present invention provide systems and method for monitoring of physical movement in relation to regions where movement is either unconditionally or conditionally unauthorized.

This summary provides only a general outline of some embodiments according to the present invention. Many other objects, features, advantages and other embodiments of the present invention will become more fully apparent from the following detailed description, the appended claims and the accompanying drawings and figures.

BRIEF DESCRIPTION OF THE DRAWINGS

A further understanding of the various embodiments of the present invention may be realized by reference to the figures which are described in remaining portions of the specification. In the figures, similar reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
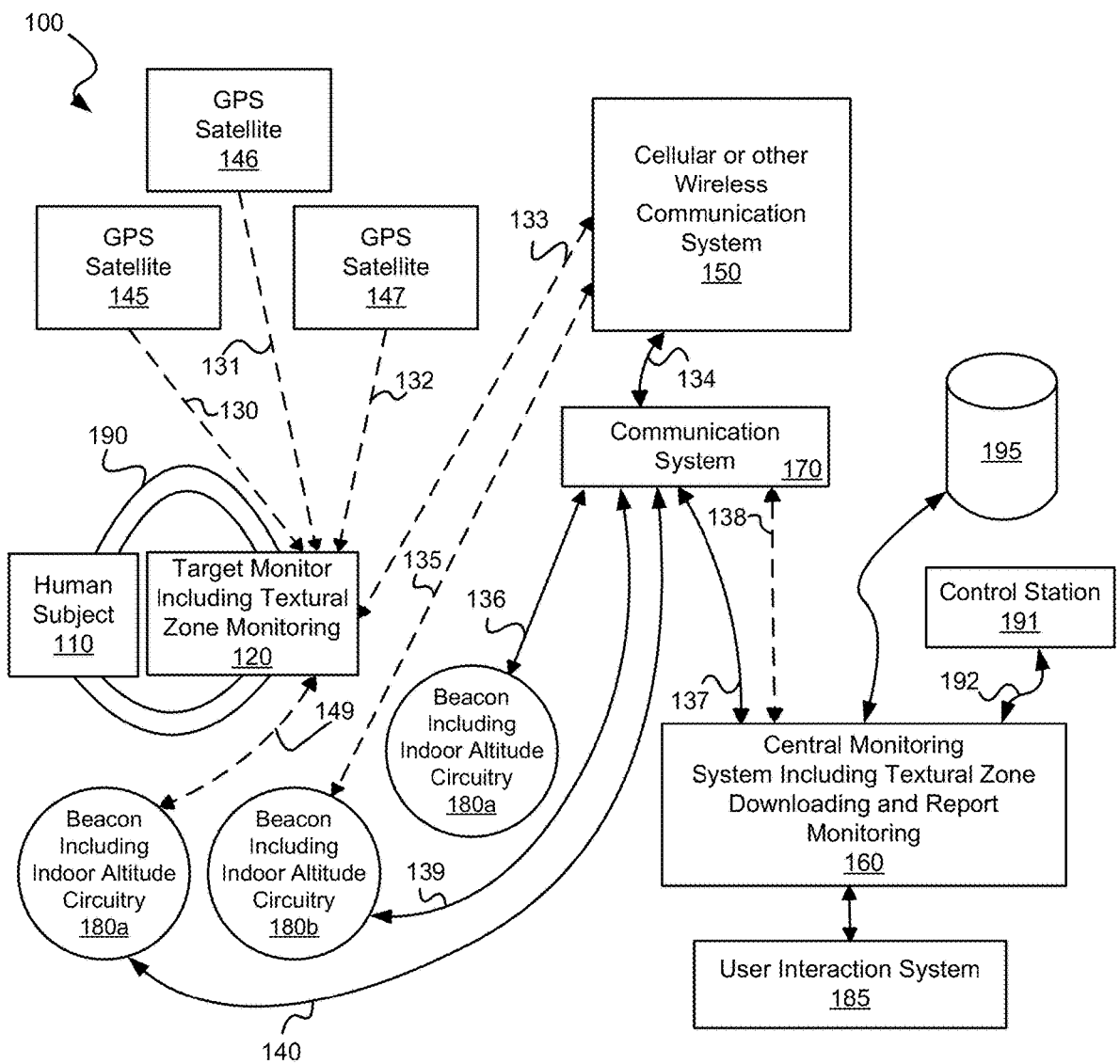
FIGS. 1a-1b show block diagrams illustrating a monitoring system including textural zone downloading and monitoring in accordance with various embodiments.

The present invention is related to monitoring movement, and in particular to systems and methods for monitoring.

Various embodiments provide monitoring systems that include a monitor device. The monitor device includes: a location determination circuit operable to determine a two-dimensional location of the monitor device; an elevation determination circuit operable to determine an elevation of the monitor device; and a memory. The memory includes: textural zone data, and instructions. The instructions are executable by the processor to: receive the two-dimensional location of the monitor device from the location determination circuit; receive the elevation of the monitor device from the elevation determination circuit; compare a combination of the two-dimensional location and the elevation with the textural zone data; and indicate a zone violation where the combination of the two-dimensional location and the elevation is in violation of a zone defined within the textural zone data.

In some instances of the aforementioned embodiments, the monitor device further includes a wireless transmitter, and indicating the zone violation includes transmitting an indication of the zone violation to a central monitor using the wireless transmitter. In some such instances, the wireless transmitter is a cellular transmitter, and/or a WiFi transmitter.

In various instances of the aforementioned embodiments, the textural zone data is textural exclusion zone data, and the zone violation is an exclusion zone violation where the combination of the two-dimensional location and the elevation is within an exclusion zone identified in the textural exclusion zone data. In other instances of the aforementioned embodiments, the textural zone data is textural exclusion zone data, and the zone violation is an exclusion zone violation where the combination of the two-dimensional location and the elevation is within an exclusion zone identified in the textural exclusion zone data. In one or more instances of the aforementioned embodiments, indicating the zone violation is done when the combination of the two-dimensional location and the elevation is in violation of a zone defined within the textural zone data for at least a defined time.

Other embodiments provide methods for monitoring that include: determining a two-dimensional location of a monitor device; determining an elevation of the monitor device; comparing a combination of the two-dimensional location and the elevation with textural zone data; and indicating a zone violation where the combination of the two-dimensional location and the elevation violates the textural zone data.

Yet other embodiments provide monitoring devices that include: a strap configured to secure the monitor device to a limb of an individual; and a housing attached to the strap. The housing holds: a location determination circuit operable to determine a two-dimensional location of the monitor device; an elevation determination circuit operable to determine an elevation of the monitor device; a processor; and a memory configured to store textural zone data including two-dimensional locations and corresponding elevations. The memory includes instructions executable by the processor to: receive the two-dimensional location of the monitor device from the location determination circuit; receive the elevation of the monitor device from the elevation determination circuit; compare a combination of the two-dimensional location and the elevation with the textural zone data; and indicate a zone violation where the combination of the two-dimensional location and the elevation violates the textural zone data.

Turning to FIG. 1a, a monitoring system 100 including textural zone downloading and monitoring is depicted in accordance with various embodiments of the present invention. Monitoring system 100 may be tailored for tracking human subjects, however, it should be noted that various implementations and deployments of monitoring system 100 may be tailored for tracking non-human targets such as, for example, other animals or inanimate assets or objects. Such inanimate assets or objects may include, but are not limited to, automobiles, boats, equipment, shipping containers or the like. In one particular embodiment, monitoring system 100 is tailored for tracking delivery vehicles. Based upon the disclosure provided herein, one of ordinary skill in the art will recognize a variety of individuals, animals and/or assets that may be monitored in accordance with different embodiments of the present invention, and/or different monitoring scenarios or systems that may be modified to incorporate one or more features disclosed herein.

Monitoring system 100 includes, but is not limited to, a target monitor device 120 that is physically coupled to a human subject 110 by a securing device 190. In some cases, securing device 190 is a strap that includes a continuity sensor that when broken indicates an error or tamper condition. Further, in some cases, target monitor device 120 includes a proximity sensor that is able to detect when it has been moved away from an individual being monitored. When such movement away from the individual is detected, an error or tamper condition may be indicated. Based on the disclosure provided herein, one of ordinary skill in the art will recognize a variety of tamper sensors that may be incorporated in either target monitor device 120 or securing device 190 to allow for detection of removal of target monitor device 120 or other improper or unexpected meddling with target monitor device 120. Further, based upon the disclosure provided herein, one of ordinary skill in the art will recognize a variety of monitors and/or securing devices that may be appropriate where the target of the monitoring is not a human or other animal subject, but rather an asset.

Target monitor device 120 is designed to provide the location of human subject 110 under a number of conditions. For example, when target monitor device 120 is capable of receiving wireless global navigation satellite system (hereinafter "GNSS") location information 130, 131, 132 from a sufficient number of GNSS satellites 145, 146, 147 respectively, target monitor device 120 may use the received wireless GNSS location information to calculate or otherwise determine the location of human subject 110. Global positioning system (hereinafter "GPS") is one example of a GNSS location system. In some instances, this location includes latitude, longitude, and elevation. Alternatively or in addition, the location of a beacon 180 that is local to target monitor device 120 may be used as the location of target monitor device 120. As yet another alternative, a cell tower based fix may be established based on cellular communication with target monitor device 120. It should be noted that other types of earth based triangulation may be used in accordance with different embodiments of the present invention. For example, other cell phone based triangulation, UHF band triangulation such as, for example, long range (hereinafter "LoRa") triangulation signals. Based on the disclosure provided herein, one of ordinary skill in the art will recognize other types of earth based triangulation that may be used.

As yet another alternative, a cell tower based fix may be established based on cellular communications between target monitor device 120 and a cellular communication system 150. Furthermore, when wireless communication link 133 between target monitor device 120 and cellular communications system 150 is periodically established, at those times, target monitor device 120 may report status and other stored records including location fixes to a central monitoring system 160 via wireless communication link 138.

Monitoring system 100 includes, but is not limited to, at least one beacon 180. Beacons 180 are instrumental for beacon based monitoring systems. Within FIG. 1a, a telemetric wireless link 149 has been depicted between beacon 180a and target monitor device 120. Each beacon 180 has an adjustable range to make telemetric wireless contact with target monitor device 120. At any point in time, depending on each beacon's 180 relative distance to target monitor device 120, none, one, or more than one tracking beacons 180 may be within transmission range of a single target monitor device 120. Likewise, it is further conceivable under various circumstances that more than one target monitor device 120 at times be within in range of a solitary beacon 180.

Telemetric wireless communications path 149 established at times between tracking beacon 180a and target monitor device 120 illustrates a common feature of various different embodiments of the current invention. Some embodiments of the various inventions vary on how, i.e., protocol, and what information and/or signaling is passed over wireless link 149. For example, in more simplified configurations and embodiments, each beacon 180 is limited to repetitively transmitting its own beacon ID and physical location information. In that way, once target monitor device 120 is within transmission range of tracking beacon 180a and establishes wireless or wired reception 149, then target monitor device 120 can record and store received beacon ID and location information. At a later time, for some embodiments of the present invention, target monitor device 120 can then report recorded readings from beacons 180 to the central monitoring system 160 over the cellular communication system 150 using wireless links 133 and 138 as depicted in FIG. 1. Furthermore, many embodiments allow for such transmissions and information passing to occur without being noticed by human subject 110, and unnoticed, automatically, and near effortlessly central monitoring system 160 is able to establish records and track human subject's 110 movements and whereabouts.

In other embodiments or configurations according to the present invention, each beacon 180 also transmit status information related to its own device health and information related from each beacon's 180 internal tampering, movement, or other sensors via a communication system 170 to central monitoring system 160. This allows for detection of movement of beacons 180, and establishing some level of confidence that the location reported by each of beacons 180 is accurate. Various other details about a beacon based system are disclosed in U.S. patent application Ser. No. 12/041,746 entitled "Beacon Based Tracking Devices and Methods for Using Such" and filed Mar. 4, 2008 by Buck et al. The entirety of the aforementioned reference is incorporated herein by reference for all purposes.

Likewise, in some other embodiments, each target monitor device 120 contains a host of their own tampering, shielding, movement, and/or other sensors related to its own device health. While still further embodiments also include a host of other measurement transducers within target monitor device 120 for extracting information, and for later reporting, related to physical properties of human subject 110. For example, measuring for the presence of alcohol and/or other drugs present in human subject 110 may be included in some embodiments of target monitor device 120. As one example, the alcohol sensor discussed in U.S. Pat. No. 7,930,927 entitled "Transdermal Portable Alcohol Monitor and Methods for Using Such" and filed by Cooper et al. on Mar. 4, 2008. The entirety of the aforementioned reference is incorporated herein by reference for all purposes.

Beacons 180 in alternative embodiments of the present invention may communicate with central monitoring system 160 independently of target monitor device 120. The monitoring system 100 illustrated in FIG. 1 shows beacon 180b having both a wireless communication link 135 with cellular communication system 150, and also illustrates beacon 180b having a hardwired communication link 139 with land communication system 170. Monitoring system 100 is also shown with beacons 180a, 180b, and 180c each having hardwired land communication links 140, 139, and 136 respectively to land communication system 170. Monitoring system 100 further illustrates land communication system 170 having a hardwired communication link 134 to cellular communication system 150, and a hardwired communication link 137 to central monitoring system 160.

In some embodiments, beacons 180 are located in areas frequented by human subject 110 where target monitor device 120 is incapable of accessing information from the GNSS system. Such beacons eliminate the need to perform an AFLT fix and avoid the costs associated therewith. As an example, human subject 110 may have a tracking beacon 180 placed within his home, and one also placed at his place of employment in close proximity to his work area. In this way, the two placed beacons, each at different prescribed times, can interact with their attached target monitor device 120 to periodically make reports to central monitoring system 160 to track movements and the whereabouts of human subject 110. All this can be done without incurring the costs associated with performing an AFLT fix.

Monitoring system 100 further includes a control station 191 that is communicably coupled to central monitoring system 160 via a communication link 192. In one particular embodiment of the present invention, control station 191 is a personal computer including a display device, a processor, and/or one or more I/O devices. Based upon the disclosure provided herein, one of ordinary skill in the art will recognize a variety of systems that may be used as control station 191 including, but not limited to, a laptop computer or a smart phone. A storage medium 195 is communicably coupled to control station 191 and maintains instructions governing the operation of textural exclusion zone and/or textural inclusion zone setup and monitoring control as discussed herein.

Central monitoring system 160 includes functionality for sending alerts to a user interaction system 185 when a tracked target ventures into a prohibited or exclusion zone. Such exclusion zones may be setup using any approach including, but not limited to, those more fully discussed below in relation to FIGS. 3 and 5. Further, such exclusion zone violations may be determined using various monitoring processes including, but not limited to, those discussed below in relation to FIGS. 4, 6, and 7. Such an user interaction system 185 may be, but is not limited to, a law enforcement computer deployed at a dispatch station of the law enforcement facility or a hand held computer or smart phone maintained by a law enforcement official. Based upon the disclosure provided herein, one of ordinary skill in the art will recognize a variety of user interaction system s185 that may be used in relation to one or more of the embodiments discussed herein.

Figure 1B:
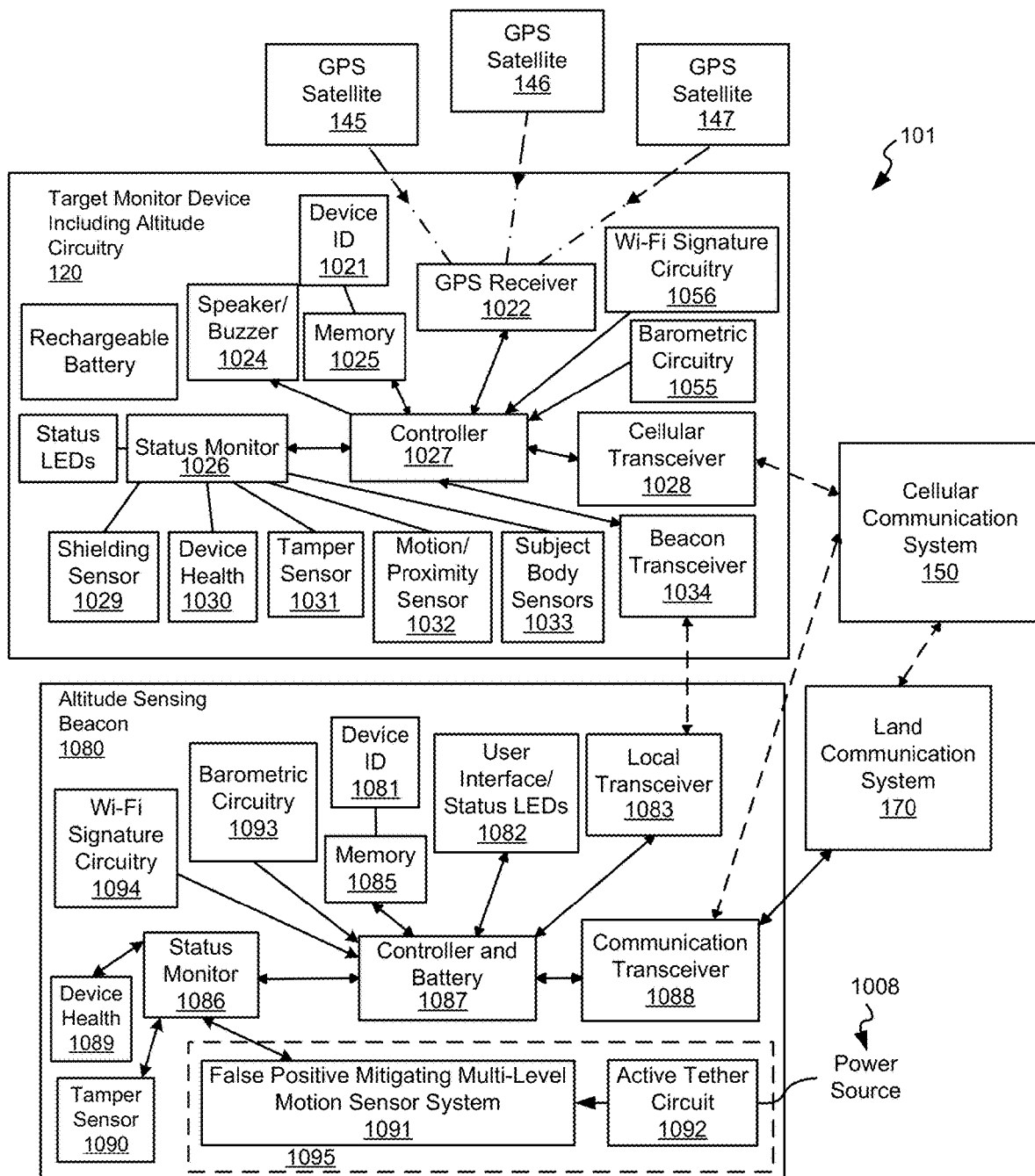

Turning to FIG. 1b, a tracking and monitoring system 101 including a single altitude sensing beacon 1080 is depicted in accordance with some embodiments. Tracking and monitoring system 101 is a subset of monitoring system 100 described above in relation to FIG. 1 a with target monitor 120 and an altitude sensing beacon 1080 (similar to beacons 180a, 180b, 180c) being shown in greater detail. As shown in FIG. 1b, tracking and monitoring system 101 includes only a single altitude sensing beacon 1080 in communication with a target monitor device 120. Target monitor device 120 is capable of receiving GNSS information from GNSS satellites 145, 146, and 147 respectively. A GNSS receiver 1022 within target monitor device 120 at times is useful for determining physical locations, i.e. whenever GNSS receiver 1022 is powered-on, and also as long as receiving sufficient GNSS satellites signal transmissions.

Tracking and monitoring system 101 illustrates target monitor device's 120 device ID 1021 being stored in a memory 1025, and is thus accessible by a controller 1027. Controller 1027 is able to interact with GNSS receiver 1022 and memory 1025 at times for storing and generating records of successively determined GNSS locations. Controller 1027 may be, but is not limited to, a microprocessor, microcontroller or other device known in the art that is capable of executing software or firmware instructions.

Controller 1027 of target monitor device 120 at times functions in conjunction with a cellular transceiver 1028 to send and receive data and signals through cellular communication system 150. This link at times is useful for passing information and/or control signals between central monitoring system 160 and target monitor device 120. Cellular communication system 150 and cellular transceiver 1028 can also at times often be useful for determining a physical location for subject devices 120 through trilateration when requested. It should be noted that the functionality of cellular communication system 150 may be performed by another wireless communication system depending upon the particular embodiment.

Target monitor device 120 further includes barometric circuitry 1055 that is capable of sensing a barometric pressure around target monitor device 120. Barometric circuitry 1055 may be any circuitry known in the art that is capable of providing an output value that changes as a function of altitude without using triangulation. In one particular embodiment, barometric circuitry 1055 is an MPL115A digital barometric pressure sensor made by Freescale Semiconductor™. Based upon the disclosure provided herein one of ordinary skill in the art will recognize a variety of systems, devices and/or circuits that may be used to implement barometric circuitry 1055. The output from barometric circuitry 1055 is provided to controller 1027. Where target monitor device 120 further includes barometric circuitry 1055, there may be no need to include an altitude sensing beacon 1080.

Target monitor device 120 further includes Wi-Fi signature circuitry 1056 that is capable of sensing Wi-Fi signals transmitted from one or more Wi-Fi access points within range of target monitor device 120. This set of signals is provided to controller 1027 as a Wi-Fi signature for target monitor device 120. As target monitor device 120 moves relative to the Wi-Fi access points, Wi-Fi signature circuitry 1056 will sense different Wi-Fi signals transmitted from Wi-Fi access points. Thus, in target monitor device 120 it results in a potential change in the recorded Wi-Fi signature.

Tracking and monitoring system 101 depicts controller 1027 interacting with a beacon transceiver 1034. A status monitor 1026 and a speaker/buzzer 1024 are all interconnected and interact through controller 1027. In alternative embodiments of the present invention, status monitor 1026 includes one or more of the following subcomponents: a set of shielding sensors 1029 that are capable of determining whether target monitor device 120 is being shielded from radio frequency (hereinafter "RF") signals such as, for example, GNSS signals or cell signals, a set of device health indicators 1030, a tamper sensor 1031 capable of determining whether unauthorized access to target monitor device 120 has occurred or whether target monitor device 120 has been removed from an associated human subject, a motion/proximity sensor 1032 capable of determining whether target monitor device 120 is moving and/or whether it is within proximity of human subject 110, and/or other body sensors 1033 for making physical measurements of human subject 110. Based on the disclosure provided herein, one of ordinary skill in the art will recognize a variety of shielding sensors, a variety of device health transducers and indicators, a variety of tamper sensors, various different types of motion sensors, different proximity to human sensors, and various human body physical measurement sensors or transducers that may be incorporated into target monitor device 120 according to various different instances and/or embodiments of the present inventions.

Altitude sensing beacon 1080 includes a local transceiver 1083 capable of providing information to target monitor device 120, and in some cases receiving information from target monitor device 120. Communication between beacon transceiver 1034 and local transceiver 1083 can be either wireless or wired. For example, the communication may be made via Universal Serial Bus protocol over a wired interface. As another non-limiting example, communication between beacon transceiver 1034 and local transceiver 1083 can be via a wireless Bluetooth™ protocol. Based on the disclosure provided herein, one of ordinary skill in the art will recognize a variety of wireless and wired interfaces and interface protocols that may be used in relation to different embodiments of the present inventions. Altitude sensing beacon 1080 further includes a device ID 1081 maintained in a memory 1085. Device ID 1081 uniquely identifies altitude sensing beacon 1080, and may in some cases be used to designate an operational difference between beacons (e.g., a beacon used to provide location information to a subject device or a beacon used to find a misplaced or discarded subject device). Altitude sensing beacon 1080 may further include a user interface 1082 that provides some indication of the operational status of the beacon.

In some instances, altitude sensing beacon 1080 includes a communications transceiver 1088 that is capable of communication via one or both of a land communication system 170 or cellular communication system 150. Altitude sensing beacon 1080 may also include a status monitor 1086 that is capable of accessing information from device health sensors 1089, tamper sensors 1090 and/or a tether based motion sensing system 1095. As shown, tether based motion sensing system 1095 includes: an active tether circuit 1092 that is operable to determine whether altitude sensing beacon 1080 is connected to a power source 1008; and a false positive mitigating multi-level motion sensor system 1091. Based on the disclosure provided herein, one of ordinary skill in the art will recognize a variety of status information that may be monitored to determine whether altitude sensing beacon 1080 is properly operational and whether the location information provided from beacon 1080 to target monitor device 120 is reliable. The various functional elements of altitude sensing beacon 1080 are controlled and powered by a controller and battery 1087 that may be, but is not limited to, a combination of a battery and a microprocessor, a microcontroller or other device known in the art that is capable of executing software or firmware instructions.

Of note, a location where altitude sensing beacon 1080 is deployed is associated with a beacon ID that is programmed into memory 1085. This beacon ID is transmitted to target monitor device 120. As tracking and monitoring system 101 relies on the location associated with the beacon ID provided from altitude sensing beacon 1080 to establish its location that is programmed to central monitoring system 160, moving the particular altitude sensing beacon away from the known location undermines the integrity of information provided from target monitor device 120 to central monitoring system 160. To avoid this, altitude sensing beacon 1080 is tethered to power source 1008. Active tether circuit 1092 determines whether altitude sensing beacon 1080 is attached to power source 1008, or is disconnected from power source 1008. Any circuit known in the art for determining whether there is a connection to a power source may be used to implement active tether circuit 1092. Active tether circuit 1092 provides an output indicating whether altitude sensing beacon 1080 is connected to power source 1008.

False positive mitigating multi-level motion sensor system 1091 is operable to detect motion of altitude sensing beacon 1080, and provides an indication of any sensed motion to status monitor 1086. The level of sensitivity of the motion sensing performed by false positive mitigating multi-level motion sensor system 1091 is dynamically selected based upon the output from active tether circuit 1092 indicating whether altitude sensing beacon 1080 is connected to power source 1008. When altitude sensing beacon 1080 is connected to power source 1008, a low sensitivity motion sensor circuit is employed to determine motion. In contrast, when altitude sensing beacon 1080 is not connected to power source 1008, a high sensitivity motion sensor circuit is employed to determine motion. Thus, when altitude sensing beacon 1080 is connected to a power source and is less likely to be the subject of problematic motion (i.e., motion that impacts the integrity of location data transferred from target monitor device 120 to central monitoring system 160), the motion sensing employed is less sensitive. As such, the possibility of a false positive (e.g., indicating motion of the altitude sensing beacon caused by loud music playing near the tethered beacon) when the altitude sensing beacon 1080 is unlikely to be moving is reduced. In contrast, the possibility of problematic motion is increased when altitude sensing beacon 1080 is disconnected from the power source, and in such a scenario the motion detection sensitivity is increased. In some cases, altitude sensing beacon 1080 includes GNSS and/or cellular communication based location circuitry that is turned on when motion is detected to obtain an updated location.

Altitude sensing beacon 1080 further includes barometric circuitry 1093 that is capable of sensing a barometric pressure around altitude sensing beacon 1080. Barometric circuitry 1093 may be any circuitry known in the art that is capable of providing an output value that changes as a function of altitude without using triangulation. In one particular embodiment, barometric circuitry 1093 is an MPL115A digital barometric pressure sensor made by Freescale Semiconductor™. Based upon the disclosure provided herein one of ordinary skill in the art will recognize a variety of systems, devices and/or circuits that may be used to implement barometric circuitry 1093. The output from barometric circuitry 1093 is provided to controller 1087.

Altitude sensing beacon 1080 further includes Wi-Fi signature circuitry 1094 that is capable of sensing Wi-Fi signals transmitted from one or more Wi-Fi access points within range of altitude sensing beacon 1080. This set of signals is provided to controller 1027 as a Wi-Fi signature for altitude sensing beacon 1080. As altitude sensing beacon 1080 moves relative to the Wi-Fi access points, Wi-Fi signature circuitry 1094 will sense different Wi-Fi signals transmitted from Wi-Fi access points. Thus, as altitude sensing beacon 1080 it results in a potential change in the produced Wi-Fi signature.

Alternatively, the Wi-Fi signature circuitry may be implemented in target monitor device 120. In such an embodiment, the Wi-Fi signature circuitry included in target monitor device 120 determines a Wi-Fi signature when in range of altitude sensing beacon 1080 which becomes a baseline signature. Later when target monitor device 120 is again within range of altitude sensing beacon 1080, the Wi-Fi signature circuitry included in target monitor device 120 re-determines a Wi-Fi signature. This newly determined Wi-Fi signature is compared with the baseline signature to determine if a change has occurred.

Figure 1C:
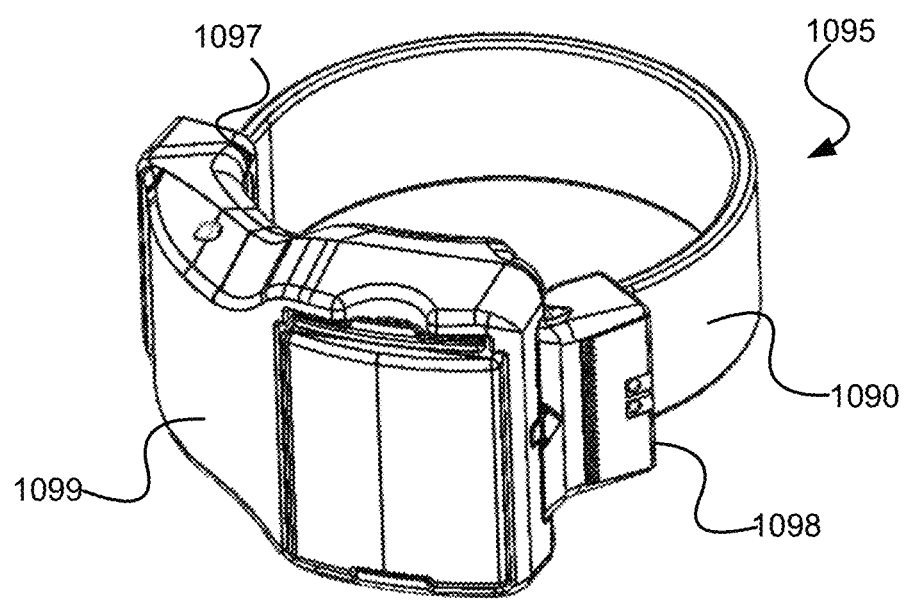
FIG. 1c shows a target monitoring device that may be attached to a target and used in relation to one or more of the embodiments discussed herein.

Turning to FIG. 1c, an example target monitor device 1099 is shown that is tailored for attachment to a human or other animal with an example attachment element 1090 connected at opposite ends of target monitor device 1099 (i.e., a first end 1097 and a second end 1098). Attachment element 1090 is operable to securely attach monitor 1095 (i.e., a combination of target monitor device 1099 and attachment element 1090) to a limb of an individual in accordance with some embodiments. In various embodiments, attachment element 1090 includes electrically and/or optically conductive material used to make a conductive connection from first end 1097 to second end 1098 through attachment element 1090 and is used in relation to determining whether target monitor device 1099 remains attached and/or has been tampered with. While FIG. 1c shows a strap as an example attachment element, based upon the disclosure provided herein, one of ordinary skill in the art will recognize other types of attachment elements that may be used in relation to different embodiments.

Figure 2A:
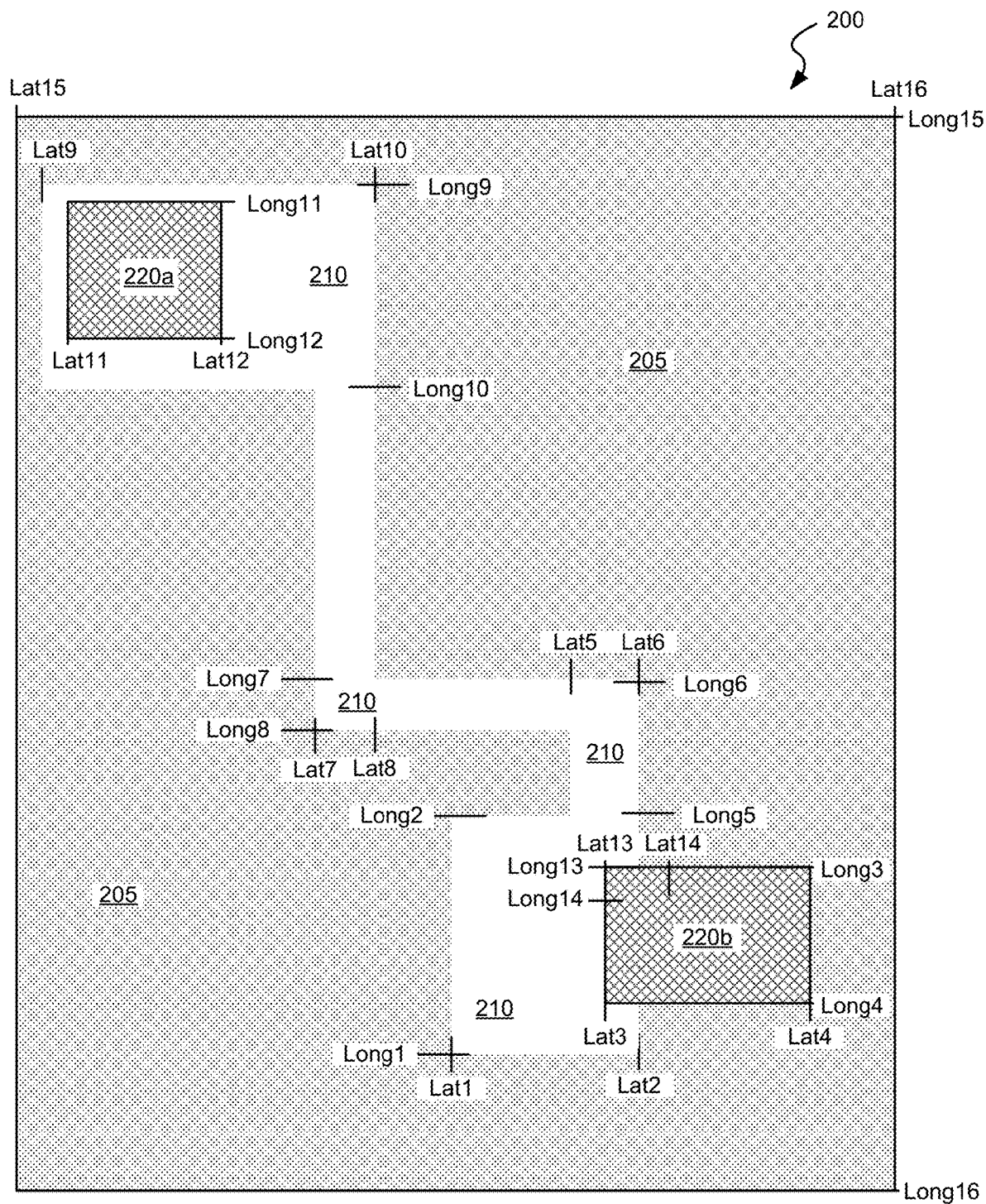
FIG. 2a shows an area having areas where movement by an individual being monitored is allowed, areas where movement by the individual being monitored is conditionally allowed, and areas where movement by the individual being monitored is not authorized in accordance with some embodiments.

Turning to FIG. 2a, an area 200 is shown that includes areas where movement by a target is unconditionally allowed (i.e., inclusion zones 210), areas where movement by the target is conditionally allowed (i.e., conditional exclusion zones 220a, 220b), and areas where movement by the target is not authorized (i.e., exclusion zone 205). As an example, conditional exclusion zone 220a may be a place of employment where the individual is allowed to be during a certain time of day. As another example, conditional exclusion zone 220a may be a building partially accessible to an individual being monitored where the partial accessibility is only allowed on some floors of the building. As yet another example, conditional exclusion zone 220a may be a building partially accessible to an individual being monitored where the partial accessibility is only allowed on some floors of the building during certain times of the day. Based upon the disclosure provided herein, one of ordinary skill in the art will recognize a variety of regions that may be conditionally accessible by an individual being monitored. As an example, conditional exclusion zone 220b may be a residence of the individual where the residence is on a known floor and location within a building at the location corresponding to conditional exclusion zone 220b. Again, based upon the disclosure provided herein, one of ordinary skill in the art will recognize a variety of regions that may be conditionally accessible by an individual being monitored. As an example, inclusion zone 210 may encompass a defined route between and around conditional exclusion zones 220 such that an individual being monitored is allowed to transit between the locations. Exclusion zone 205 includes all areas where the individual being monitored is precluded from moving. Area 200 is reduced to textural exclusion zone data that is used to determine whether a monitored individual is staying within areas where their movement is authorized.

It should be noted that while the embodiment of FIG. 2a is discussed as setting up one or more "textural exclusion zones", other embodiments may involve setting up one or more "textural inclusion zones" or a combination of one or more textural inclusion zones and textural exclusion zones. As used herein, the phrase "exclusion zone" is used in its broadest sense to mean any two-dimensional area (e.g., a region defined as range of latitudes and longitudes or other defining vertices) where an individual is not allowed to enter. Thus, for example, an exclusion zone may be an area around a school. As used herein, the phrase "inclusion zone" is used in its broadest sense to mean any two-dimensional area (e.g., a region defined as range of latitudes and longitudes or other defining vertices) where an individual is expected to be during one or more defined time intervals. Thus, for example, an inclusion zone may be a city or region within a city (e.g., the home or work location of the individual) where the individual is expected to be during one or more defined time intervals. As used herein, the phrase "textural exclusion zone" is used in its broadest sense to mean any region including a two-dimensional area (e.g., a region defined as range of latitudes and longitudes or other defining vertices) plus another dimension where an individual is not allowed to enter. Thus, for example, a textural exclusion zone may be certain floors within a multi-story building. As used herein, the phrase "textural inclusion zone" is used in its broadest sense to mean any region including a two-dimensional area (e.g., a region defined as range of latitudes and longitudes or other defining vertices) plus another dimension where an individual is expected to be during one or more defined time intervals. Thus, for example, a textural inclusion zone may be certain floors within a multi-story building. As used herein, the phrase "textural zone" generally refers to any region including a two-dimensional area (e.g., a region defined as range of latitudes and longitudes or other defining vertices) plus another dimension that may be either a textural inclusion zone or a textural exclusion zone. Based upon the disclosure provided herein, one of ordinary skill in the art will recognize a variety of textural exclusion zones, textural inclusion zones, and/or combinations thereof that may be defined and monitored in accordance with various embodiments. Where a textural zone is two-dimensional data plus elevation data, it may define planar two-dimensional regions, spheres, ellipsoids, cylinders, and/or other three-dimensional areas such a cubes or other multi-vertice three-dimensional regions.

It is noted that while the zones of FIG. 2a are described using latitudes and longitudes, other definitions may be used in relation to different embodiments. For example, a two-dimensional zone (either exclusion zone or inclusion zone) may be defined using multiple vertices with straight lines between the respective vertices. Thus, using the example of FIG. 2a, the overall inclusion zone extending from lat9, long9 to lat2, long1 may be defined as a single polygon with multiple vertices and boundaries extending between the vertices. It is also noted that the boundaries extending between the vertices are not necessarily limited to perpendicular lines, but rather may be lines intersecting at any angle. Additionally, it is noted that two dimensional regions may be defined as circles or ellipses. Thus, for example, where a certain building is to be designated as either an exclusion zone or an inclusion zone, the building and some of the area surrounding the building may simply be encompassed in a single circle or a single ellipse. Based upon the disclosure provided herein, one of ordinary skill in the art will recognize a variety of ways in which two-dimensional zones may be defined in relation to different embodiments.

Figure 2B:
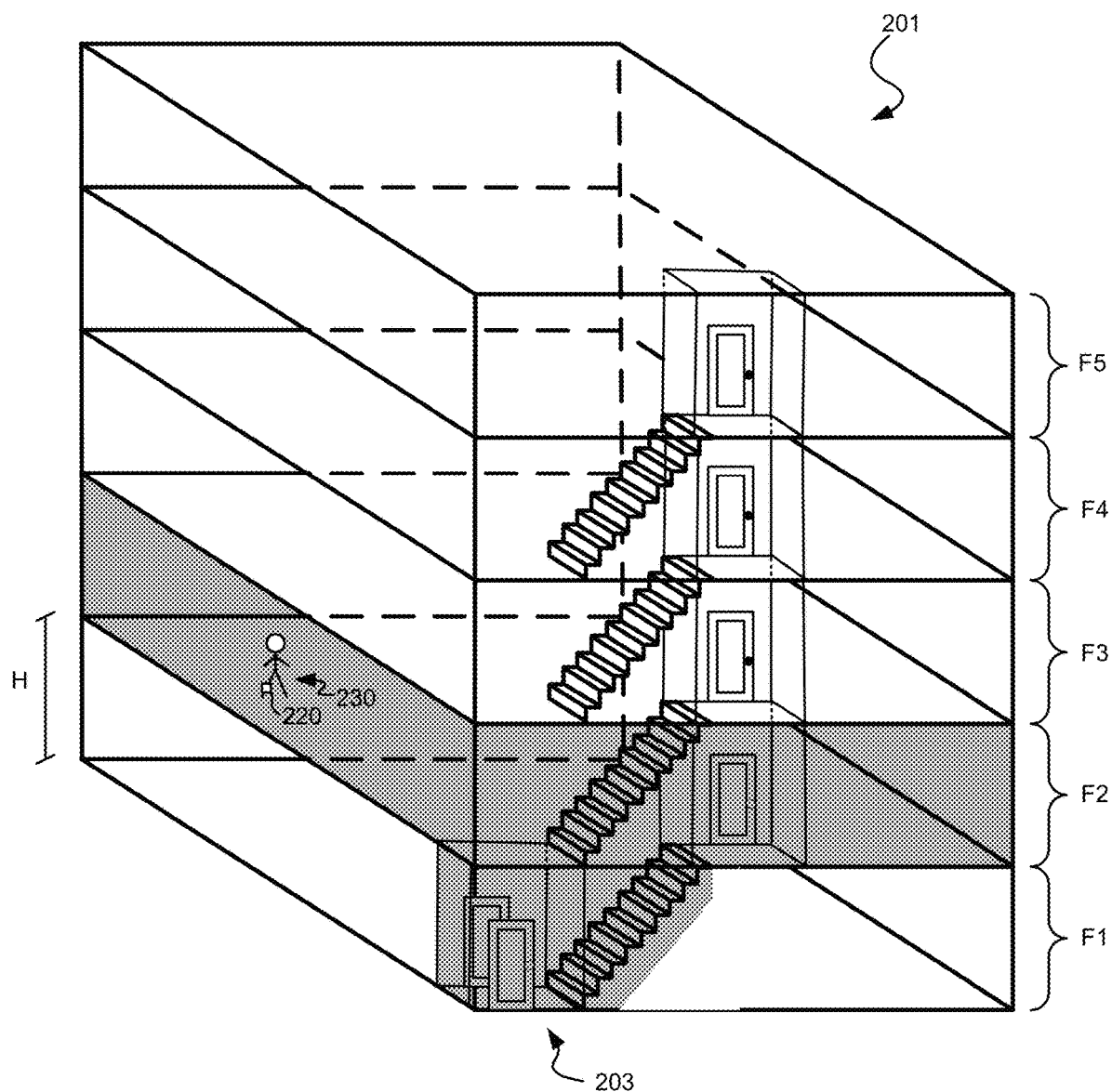
FIG. 2b shows a building where movement by the individual being monitored is allowed in some areas of the building and not other areas in accordance with some embodiments.

FIG. 2b shows a building 201 where movement by the individual being monitored is allowed in some areas of the building and not other areas. As shown, building 201 includes a number of floors (F1-F5) each of a height H. In this embodiment, a target monitor device 220 is secured to the leg of an individual being monitored 230, and the individual being monitored is only allowed to be on the second floor (F2) of building 201, and a first stairwell area 203 of the first floor (F1) allowing for individual 230 to transit to the second floor (i.e., the areas shown in grey). In this case, the entire building 201 is a conditional exclusion zone where the condition is that the individual is either at the elevation of the second floor (F2) or lower than the elevation of the third floor (F3) within the first stairwell area 203. While the inclusion area of the conditional exclusion zone includes the entire second floor (F2) of building 201, based upon the disclosure provided herein, it will be recognized that only a subset of the second floor may be allowed by restricting the latitude and longitude of the second floor. This may be useful, for example, to allowed an individual being monitored to go to only a particular apartment within the second floor. On the other hand, the individual may be allowed on a number of floors. This is useful, for example, where the individual's employer operates across multiple floors of a given building. Building 201 is a particular example of, for example, one of conditional exclusion zones 220a, 220b. In some cases, the elevation of individual 230 within building 201 is determined based upon one or more altitude sensing beacons 1080 (not shown) deployed on one or more floors of building 201. Such altitude determination may be done, for example, using the systems and methods discussed in U.S. Pat. No. 10,097,952 entitled "Systems and Methods for Monitoring Altitude Sensing Beacons" and filed May 20, 2016 by Buck et al. The entirety of the aforementioned reference is incorporated herein by reference for all purposes.

Alternatively, or in addition, such altitude sensing may be done using barometric circuitry 1055 included in target monitor device 120. The barometric pressure information sensed by barometric circuitry 1055 is transmitted to central monitoring system 160. In turn, central monitoring system 160 transmits the barometric pressure information and the two dimensional location of target monitor device 120 to a third party provider that resolves the location to either a floor or a range of floors in a building located at the two dimensional location. This floor information may then be transferred to target monitor device 120 where it is used in determining violation of either a textural inclusion zone or a textural exclusion zone. Alternatively, the determination of a violation of either a textural inclusion zone or a textural exclusion zone may be done at the central monitoring station 160, and the result of the determination provided to target monitor device 120. Based upon the disclosure provided herein, one of ordinary skill in the art will recognize other altitude or elevation determination processes and/or circuitry that may be used in relation to different embodiments for determining multi-dimensional location of an individual, and monitoring and alerting processes associated therewith.

It is noted that "grace periods" may be employed to modify the complexity of establishing and monitoring zones. Such grace periods allow an individual to be within an exclusion zone or outside of an inclusion zone for a grace period. Where the individual is within an exclusion zone or outside of an inclusion zone for less than the grace period, the violation is logged, but an alert is not generated. This would allow, for example, identification of floor F2 of building 201 as an inclusion zone without defining stairwell 203 as an inclusion zone. As such, the inclusion zone would look like a square disk disconnected from the ground. An individual could then enter stairwell 203 for a limited time period (e.g., a time sufficient to traverse stairwell 203 on one's way to floor F2) without generating an alert. The traversal of stairwell 203 would be logged, but would not generate an alert as long as the individual does not remain in the traversal region (e.g., within building 201 at floor F1) for more than the grace period. The time for the grace period may be carefully determined for each traversal region, or a general default time may be used for a number of traversal regions.

Figure 3:
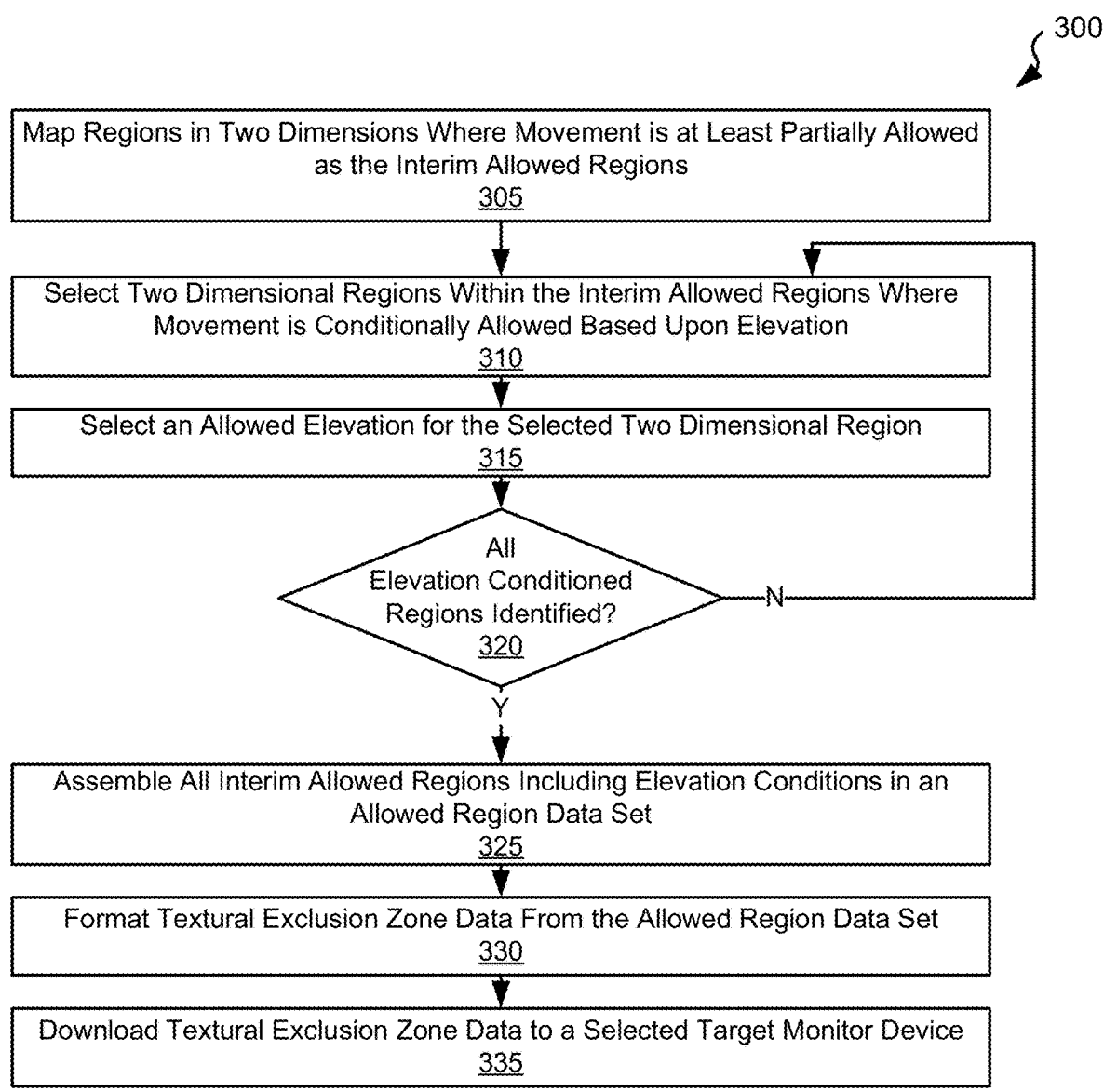
FIG. 3 is a flow diagram depicting a method for preparing textural exclusion zone data in accordance with some embodiments.

Turning to FIG. 3, a flow diagram 300 depicts a method for preparing textural exclusion zone data in accordance with some embodiments. Following flow diagram 300, regions where movement is at least partially allowed are mapped in two dimensions (block 305). Using FIG. 2a as an example, this includes mapping inclusion zones 210 and conditional exclusion zones 220a, 220b. This mapping is done in two dimensions where the ranges of latitude and longitude are selected to define the combination of inclusion zones 210 and conditional exclusion zones 220a, 220b in two dimensions. This combination of inclusion zones 210 and conditional exclusion zones 220a, 220b mapped in two dimensions is identified as interim allowed regions. In one embodiment, the interim allowed regions are described as a series of rectangles in the form of: lat1-lat2 and long1-long2, 0, lat3-lat4 and long3-long4, 0, lat5-lat6 and long5-long6, 0, lat7-lat8 and long7-long8 , 0, lat9-lat10 and long9-long10, 0, lat11-lat12 and long11-long12, 0, and lat13-lat14 and long13-long14, 0 (as shown on FIG. 2a). The "0" between each of the ranges of latitudes and longitudes indicates that there is no condition on the previously identified latitude and longitude region. Such interim allowed regions are non-textural in nature as they are simply flat (two dimensional) allowing movement within the region without regard to elevation, time, or other condition.

A subset of interim allowed regions are identified as regions where movement is only conditionally allowed (block 310). Thus, using FIG. 2a again as an example, within the interim allowed regions (i.e., inclusion zone 210 and conditional exclusion zones 220a, 220b), a subset of regions (i.e., conditional exclusion zones 220a, 220b) are identified to be limited by a condition. Where an elevation condition is to be applied to a particular region (block 310), an elevation where the selected subset of the interim allowed region is accessible is identified (block 315). It is then determined whether all conditions for the interim allowed regions have been identified (block 320). Where other conditions need to be identified (block 320), the processes of blocks 310-320 are repeated.

Alternatively, where all of the conditions for the interim allowed regions have been identified (block 320), all of the interim allowed regions are assembled with the previously identified conditions to yield an allowed region data set (block 325). Using the combination of FIGS. 2a-2b as an example, the combination of inclusion zones 210 and conditional exclusion zones 220a, 220b are modified by adding, for example, an elevation condition between Elevation1 and Elevation3 for a first portion of conditional exclusion zone 220b (i.e., stairwell 203 defined in two dimensions as lat13-lat14 and long 13-long14) and for an elevation condition between Elevation2 and Elevation3 for the entirety of conditional exclusion zone 220b (i.e., the entire second floor (F2) of building 201 defined in two dimensions as lat3-lat4 and long 3-long4). This results in the following example of allowed region data set: lat1-lat2 and long1-long2, 0, lat3-lat4 and long3-long4, Elevation2-Elevation3, 0, lat5-lat6 and long5-long6, 0, lat7-lat8 and long7-long8 , 0, lat9-lat10 and long9-long10, 0, lat11-lat12 and long11-long12, 0, and lat13-lat14 and long13-long14, Elevation1-Elevation3, 0. The "0" between each of the defined allowed regions indicates that there is no additional condition on the previously identified region. Such an allowed region data set is textural in nature as they are more than simply flat allowing movement within the region without regard to elevation, time, or other condition.

The allowed region data set is then formatted as textural exclusion zone data that indicates all regions where the individual being monitored is not allowed to move (block 330). Such formatting effectively inverts the previously discussed allowed region data set including conditions. The textural exclusion zone data identifies all regions where the individual being monitored is not allowed to move without condition, and all regions where the individual being monitored is conditionally not allowed to move including the specified condition(s). This textural exclusion zone data is downloaded to a selected target monitor device associated with the individual being monitored to which the data applies (block 335). This download may be performed using, for example, any communication link available between central monitoring system 160 and target monitor device 120.

Figure 4:
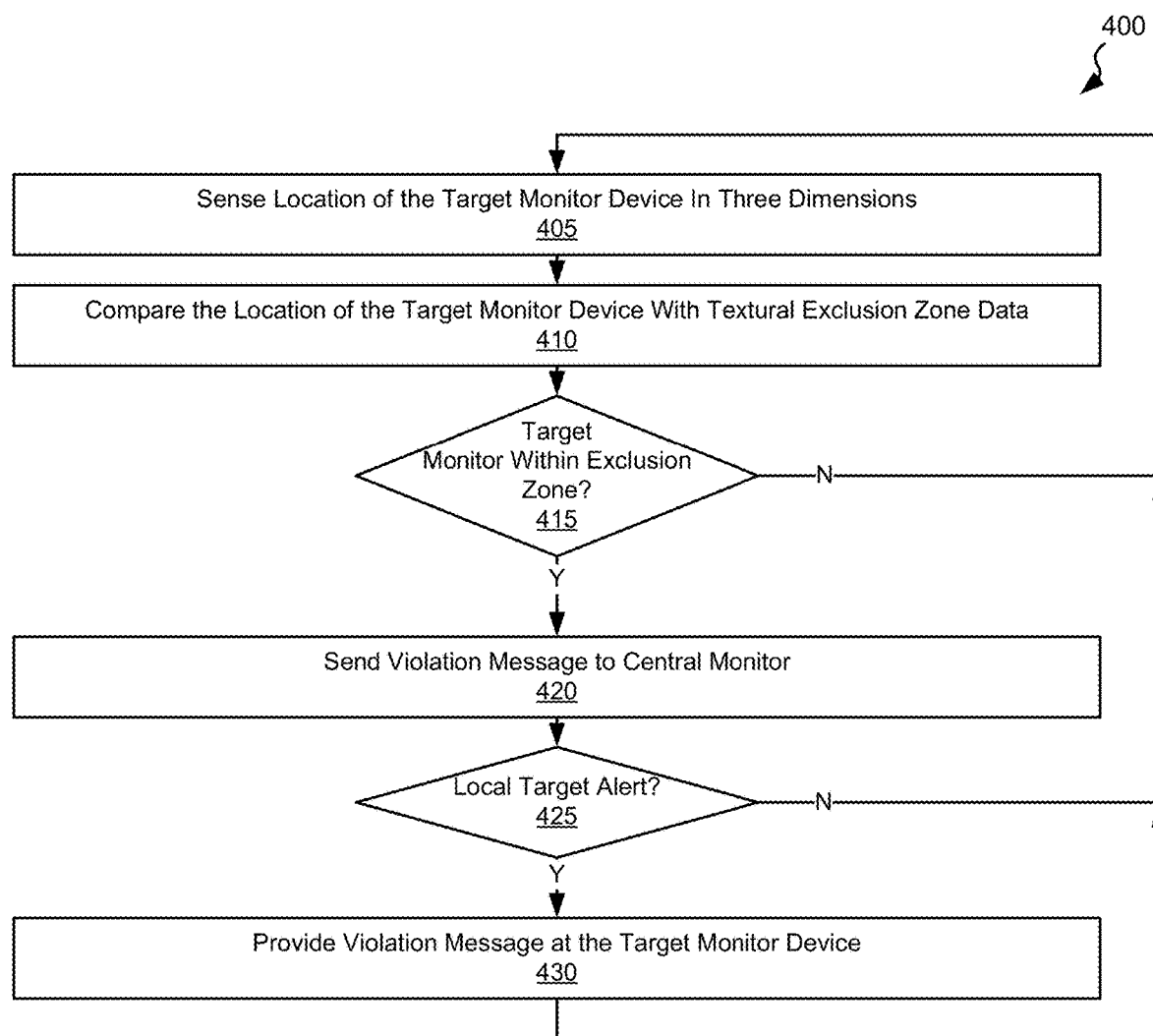
FIG. 4 is a flow diagram depicting a method for target monitoring based upon textural exclusion zone data in accordance with various embodiments.

Turning to FIG. 4, a flow diagram 400 depicts a method for target monitoring based upon textural exclusion zone data in accordance with various embodiments. Following flow diagram 400, the location of a target monitor device is sensed in three-dimensions (block 405). In some cases, this process involves receiving a signal from GNSS satellites (e.g., GNSS satellites 145, 146, 147) by a GNSS receiver (e.g., GNSS receiver 1022). In turn, the GNSS receiver calculates a location of the target monitor device. Alternatively, or in addition, location data is received from a beacon (e.g., beacon 1080). This location data is provided to a controller (e.g., controller 1027).

The sensed location of the target monitor device is compared with textural exclusion zone data (block 410). Such textural exclusion zone data identifies locations in three-dimensions where the individual is precluded from moving. An example of textural exclusion zone data may be derived from the example disclosed in FIGS. 2a-2b. The example exclusion zone data may preclude movement by an individual associated with the target monitor device beyond inclusion zones 210 and within the precluded elevation within conditional exclusion zones 220a, 220b.

Where the comparison between the location of the target monitor device and the textural exclusion zone data indicates that the target monitor device is within an exclusion zone (block 415), a violation message is sent by the target monitor device to a central monitor station (block 420). This can include, for example, communicating an alert indicating the location of the target monitor device and the time of the violation. This message is formatted and sent via a cellular transceiver (e.g., cellular transceiver 1028) and/or via an Internet link (e.g., via a WiFi transceiver or other wireless communication link).

It is then determined whether the individual associated with the target monitor device is to be alerted of the violation (which would allow the individual to know that a monitoring person has also been alerted) (block 425). Where the individual associated with the target monitor device is to be alerted (block 425), a violation message is provided to the individual (block 430). This alert to the individual being monitored may be provided via, for example, a display and/or an audio output on the target monitor device. In some cases, the alert not only identifies the violation, but also indicates instructions that if followed by the individual associated with the target monitor device will cure the violation.

Figure 5:
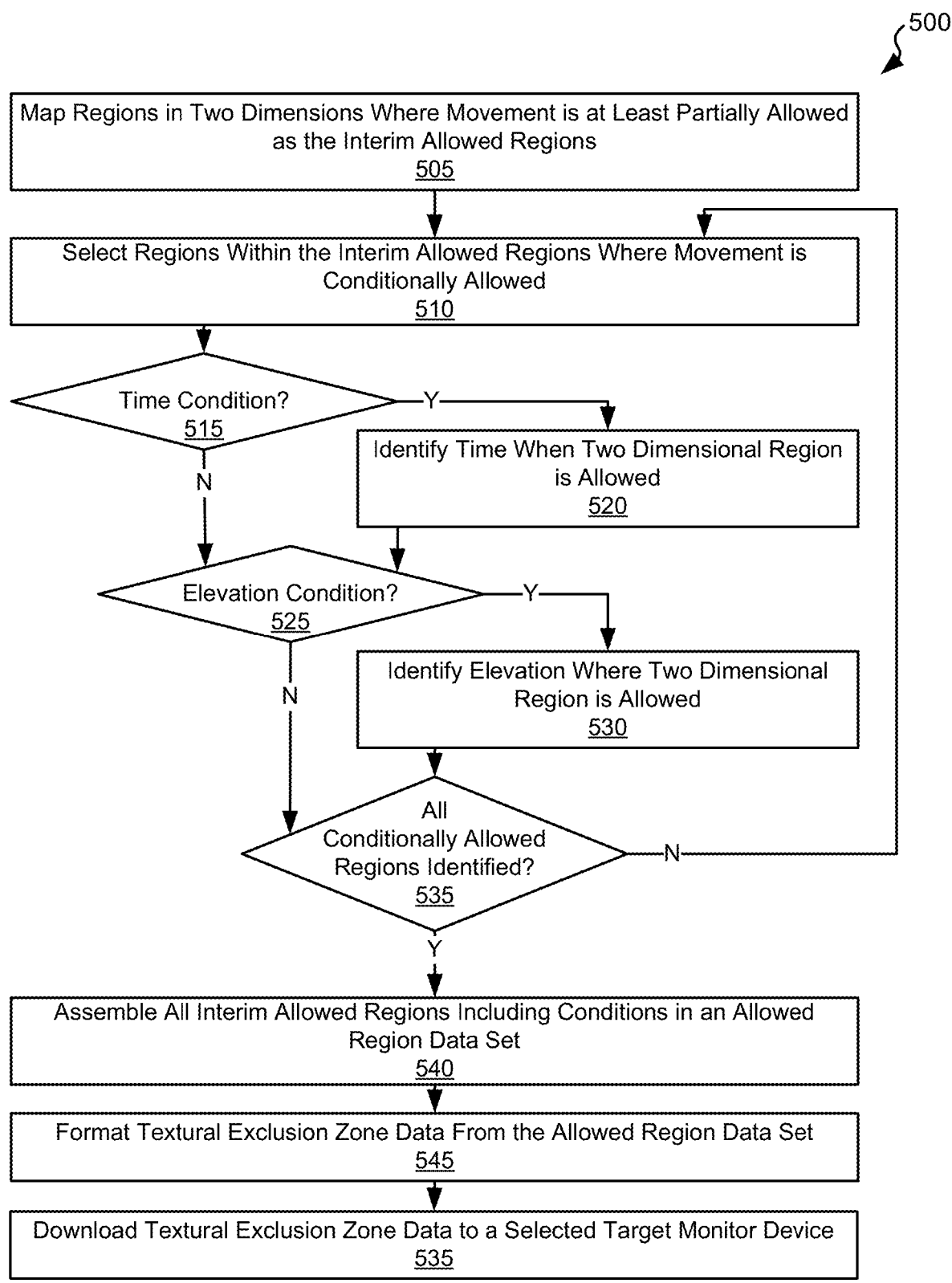
FIG. 5 is a flow diagram depicting another method for preparing textural exclusion zone data in accordance with other embodiments.

Turning to FIG. 5, a flow diagram 500 depicts another method for preparing textural exclusion zone data in accordance with various embodiments. Following flow diagram 500, regions where movement is at least partially allowed are mapped (block 505). Using FIG. 2a as an example, this includes mapping inclusion zones 210 and conditional exclusion zones 220a, 220b. This mapping is done in two dimensions where the ranges of latitude and longitude are selected to define the combination of inclusion zones 210 and conditional exclusion zones 220a, 220b in two dimensions. This combination of inclusion zones 210 and conditional exclusion zones 220*a*, 220*b* mapped in two dimensions is identified as interim allowed regions. In one embodiment, the interim allowed regions are described as a series of rectangles in the form of: lat1-lat2 and long1-long2, 0, lat3-lat4 and long3-long4, 0, lat5-lat6 and long5-long6, 0, lat7-lat8 and long7-long8 , 0, lat9-lat10 and long9-long10, 0, lat11-lat12 and long11-long12, 0, and lat13-lat14 and long13-long14, 0 (as shown on FIG. 2*a*). The "0" between each of the ranges of latitudes and longitudes indicates that there is no condition on the previously identified latitude and longitude region. Such interim allowed regions are non-textural in nature as they are simply flat allowing movement within the region without regard to elevation, time, or other condition.

A subset of interim allowed regions are identified as regions where movement is only conditionally allowed (block 510). Thus, using FIG. 2*a* again as an example, within the interim allowed regions (i.e., inclusion zone 210 and conditional exclusion zones 220*a*, 220*b*), a subset of regions (i.e., conditional exclusion zones 220*a*, 220*b*) are identified to be limited by a condition. Where a time condition is to be applied to a particular region (block 515), a time when the selected subset of the interim allowed region is accessible is identified (block 520). Alternatively, or in addition, where an elevation condition is to be applied to a particular region (block 525), an elevation where the selected subset of the interim allowed region is accessible is identified (block 530). It is then determined whether all conditions for the interim allowed regions have been identified (block 535). Where other conditions need to be identified (block 535), the processes of blocks 510-535 are repeated.

Alternatively, where all of the conditions for the interim allowed regions have been identified (block 535), all of the interim allowed regions are assembled with the previously identified conditions to yield an allowed region data set (block 540). Using the combination of FIGS. 2*a*-2*b* as an example, the combination of inclusion zones 210 and conditional exclusion zones 220*a*, 220*b* are modified by adding, for example, a time condition to conditional exclusion zone 220*a* (lat11-lat12 and long11-long12) of between Time1 and Time2, and by adding both a time condition from between Time3 and Time4 for all of conditional exclusion zone 220*b*, and an elevation condition between Elevation1 and Elevation3 for a first portion of conditional exclusion zone 220*b* (i.e., stairwell 203 defined in two dimensions as lat13-lat14 and long 13-long14) and for an elevation condition between Elevation2 and Elevation3 for the entirety of conditional exclusion zone 220*b* (i.e., the entire second floor (F2) of building 201 defined in two dimensions as lat3-lat4 and long 3-long4). This results in the following example of allowed region data set: lat1-lat2 and long1-long2, 0, lat3-lat4 and long3-long4, Time3-Time4, Elevation2-Elevation3, 0, lat5-lat6 and long5-long6, 0, lat7-lat8 and long7-long8, 0, lat9-lat10 and long9-long10, 0, lat11-lat12 and long11-long12, Time1-Time2, 0, and lat13-lat14 and long13-long14, Time3-Time4, Elevation1-Elevation3, 0. The "0" between each of the defined allowed regions indicates that there is no additional condition on the previously identified region. Such an allowed region data set is textural in nature as they are more than simply flat allowing movement within the region without regard to elevation, time, or other condition.

The allowed region data set is then formatted as textural exclusion zone data that indicates all regions where the individual being monitored is not allowed to move (block 545). Such formatting effectively inverts the previously discussed allowed region data set including conditions. The textural exclusion zone data identifies all regions where the individual being monitored is not allowed to move without condition, and all regions where the individual being monitored is conditionally not allowed to move including the specified condition(s). This textural exclusion zone data is downloaded to a selected target monitor device associated with the individual being monitored to which the data applies (block 535). This download may be performed using, for example, any communication link available between central monitoring system 160 and target monitor device 120.

Figure 6:
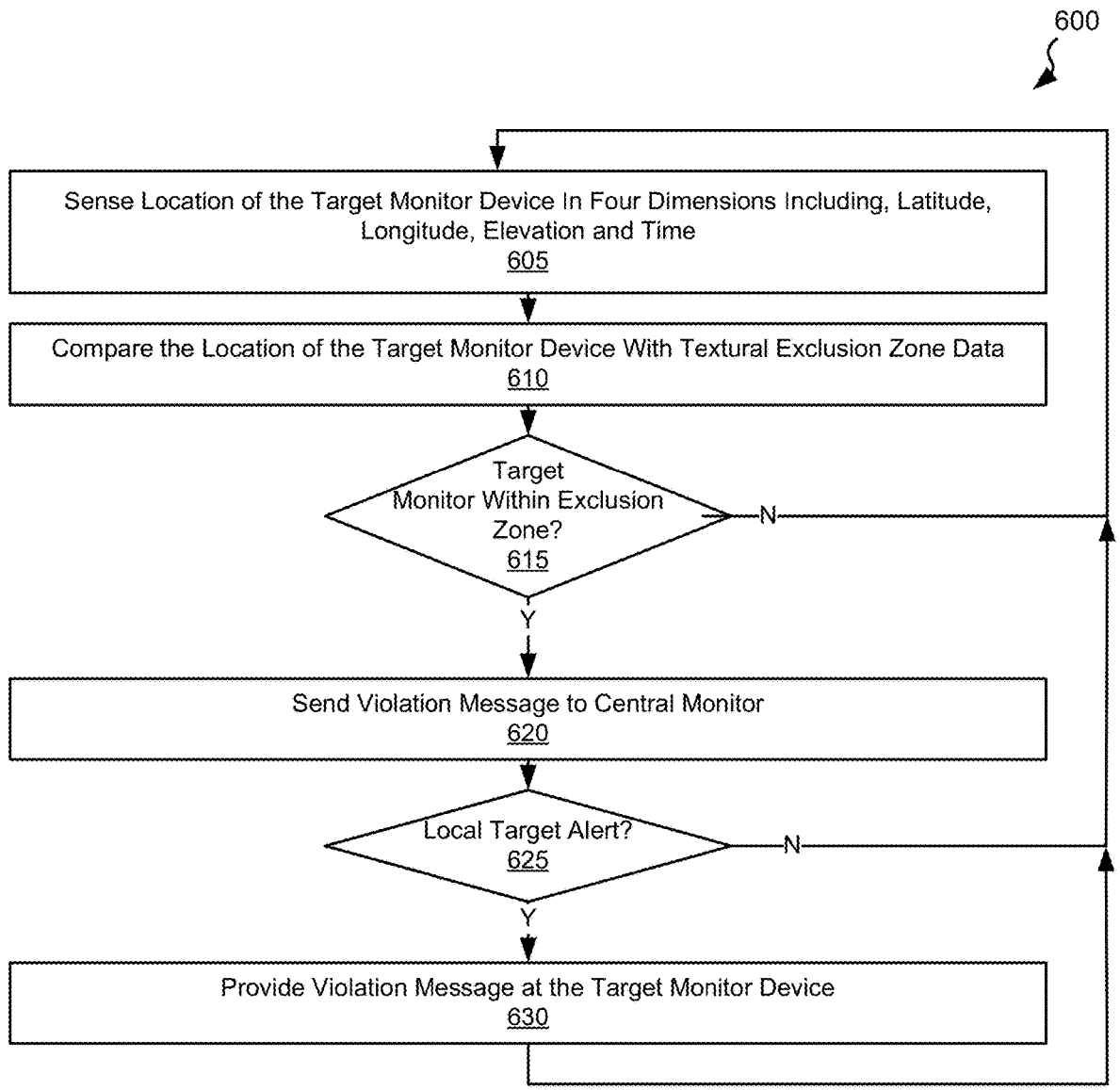
FIG. 6 is a flow diagram depicting another method for target monitoring based upon textural exclusion zone data in accordance with various embodiments.

Turning to FIG. 6, a flow diagram 600 depicts another method for target monitoring based upon textural exclusion zone data in accordance with various embodiments. Following flow diagram 600, the location of a target monitor device is sensed in four-dimensions including two dimensional location (e.g., latitude and longitude), elevation, and time (block 605). In some cases, this process involves receiving a signal from GNSS satellites (e.g., GNSS satellites 145, 146, 147) by a GNSS receiver (e.g., GNSS receiver 1022). In turn, the GNSS receiver calculates a location of the target monitor device. Alternatively, or in addition, location data is received from a beacon (e.g., beacon 1080). This location data is provided to a controller (e.g., controller 1027). The aforementioned provides a physical, three-dimensional location. In addition, a fourth dimension of time is sensed. Sensing time may be done, for example, reading a time value form a clock included as part of a target monitor device.

The sensed four-dimensional data of the target monitor device is compared with textural exclusion zone data (block 610). Such textural exclusion zone data identifies locations in the same four-dimensions where the individual is precluded from moving. For example, an individual may be precluded from the individual associated with the target monitor device from moving within an area defined by ranges of latitude and longitude. In some cases, the individual may be precluded from moving within an area defined by ranges of latitude, longitude, and time. In various cases, the individual may be precluded from moving within an area defined by ranges of latitude, longitude, and elevation. In yet other cases, the individual may be precluded from moving within an area defined by ranges of latitude, longitude, time, and elevation. An example of textural exclusion zone data may be derived from the example disclosed in FIGS. 2*a*-2*b*. The example exclusion zone data may preclude movement by an individual associated with the target monitor device beyond inclusion zones 210 and within the precluded elevation within conditional exclusion zones 220*a*, 220*b*.

Where the comparison between the location of the target monitor device and the textural exclusion zone data indicates that the target monitor device is within an exclusion zone (block 615), a violation message is sent by the target monitor device to a central monitor station (block 620). This can include, for example, communicating an alert indicating the location of the target monitor device and the time of the violation. This message is formatted and sent via a cellular transceiver (e.g., cellular transceiver 1028) and/or via an Internet link (e.g., via a WiFi transceiver).

It is then determined whether the individual associated with the target monitor device is to be alerted of the violation (which would allow the individual to know that a monitoring person has also been alerted) (block 625). Where the individual associated with the target monitor device is to be alerted (block 625), a violation message is provided to the individual (block 630). This alert to the individual being monitored may be provided via, for example, a display and/or an audio output on the target monitor device. In some cases, the alert not only identifies the violation, but also indicates instructions that if followed by the individual associated with the target monitor device will cure the violation.

Figure 7:
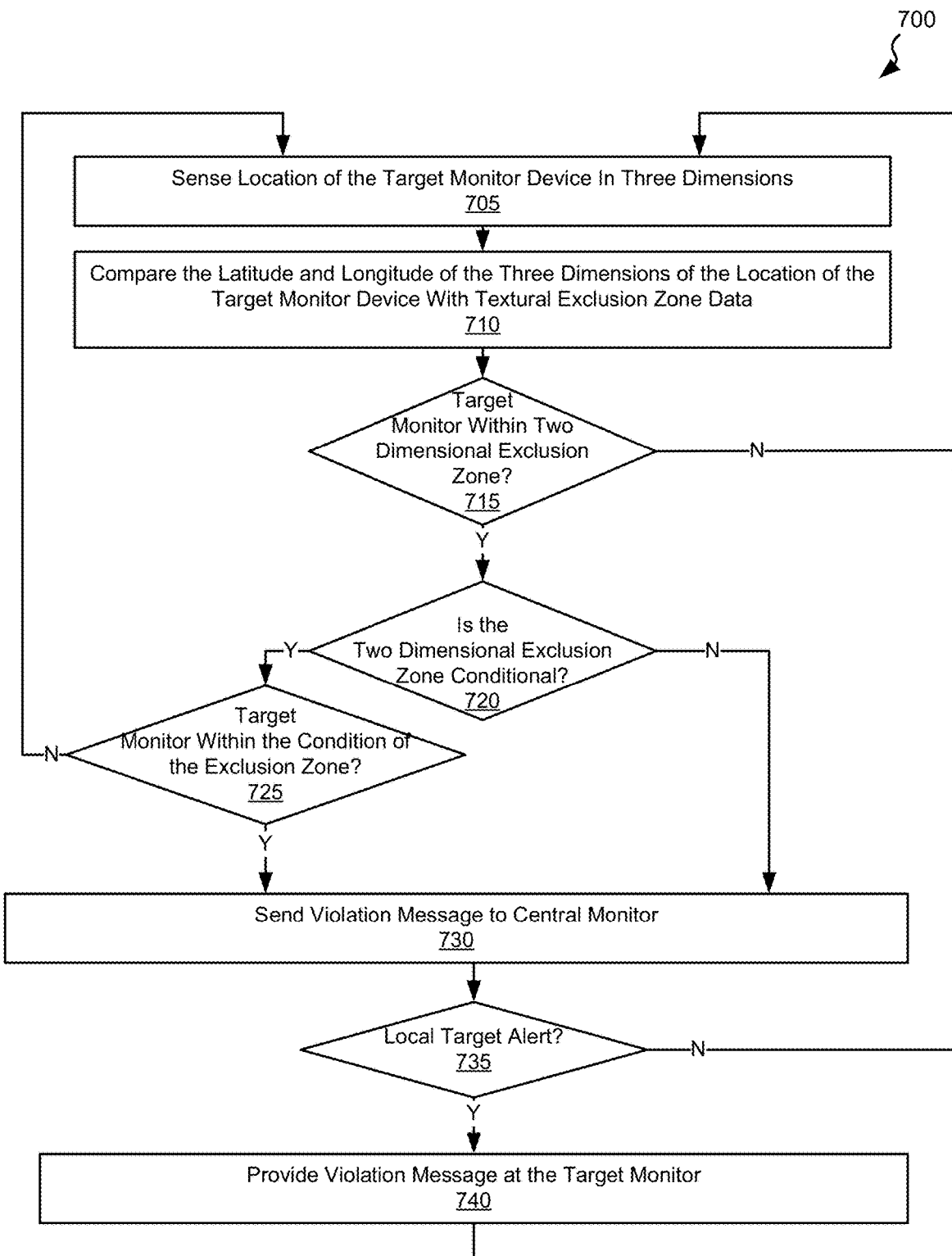
FIG. 7 is a flow diagram depicting yet another method for target monitoring based upon textural exclusion zone data in accordance with other embodiments.

Turning to FIG. 7, a flow diagram 700 depicts another method for target monitoring based upon textural exclusion zone data in accordance with various embodiments. Following flow diagram 700, the location of a target monitor device is sensed in three-dimensions (block 705). In some cases, this process involves receiving a signal from GNSS satellites (e.g., GNSS satellites 145, 146, 147) by a GNSS receiver (e.g., GNSS receiver 1022). In turn, the GNSS receiver calculates a location of the target monitor device. Alternatively, or in addition, location data is received from a beacon (e.g., beacon 1080). This three-dimensional location data is provided to a controller (e.g., controller 1027).

The latitude and longitude data of the sensed three-dimensional data of the target monitor device is compared with corresponding latitude and longitude information in textural exclusion zone data (block 710). From this comparison, it is determined whether the two-dimensional location of the target monitor device corresponds to a two dimensional location identified in the textural exclusion zone data (block 715). Where the target monitor device does correspond to a two-dimensional location identified in the textural exclusion zone data (block 715), it is determined if the two-dimensional location identified in the textural exclusion zone data is conditional (block 720).

Where the two-dimensional location identified in the textural exclusion zone data is not conditional (block 720), a violation message is sent by the target monitor device to a central monitor station (block 730). This can include, for example, communicating an alert indicating the location of the target monitor device and the time of the violation. This message is formatted and sent via a cellular transceiver (e.g., cellular transceiver 1028) and/or via an Internet link (e.g., via a WiFi transceiver).

Alternatively, where the two-dimensional location identified in the textural exclusion zone data is conditional (block 720), it is determined whether the condition is met (block 725). For example, where the condition is an elevation condition, it is determined if the location of the monitor device corresponds to the elevation condition. Where it is determined that the condition is met (block 725), a violation message is sent by the target monitor device to a central monitor station (block 730).

It is then determined whether the individual associated with the target monitor device is to be alerted of the violation (which would allow the individual to know that a monitoring person has also been alerted) (block 735). Where the individual associated with the target monitor device is to be alerted (block 735), a violation message is provided to the individual (block 740). This alert to the individual being monitored may be provided via, for example, a display and/or an audio output on the target monitor device. In some cases, the alert not only identifies the violation, but also indicates instructions that if followed by the individual associated with the target monitor device will cure the violation.

Figure 8:
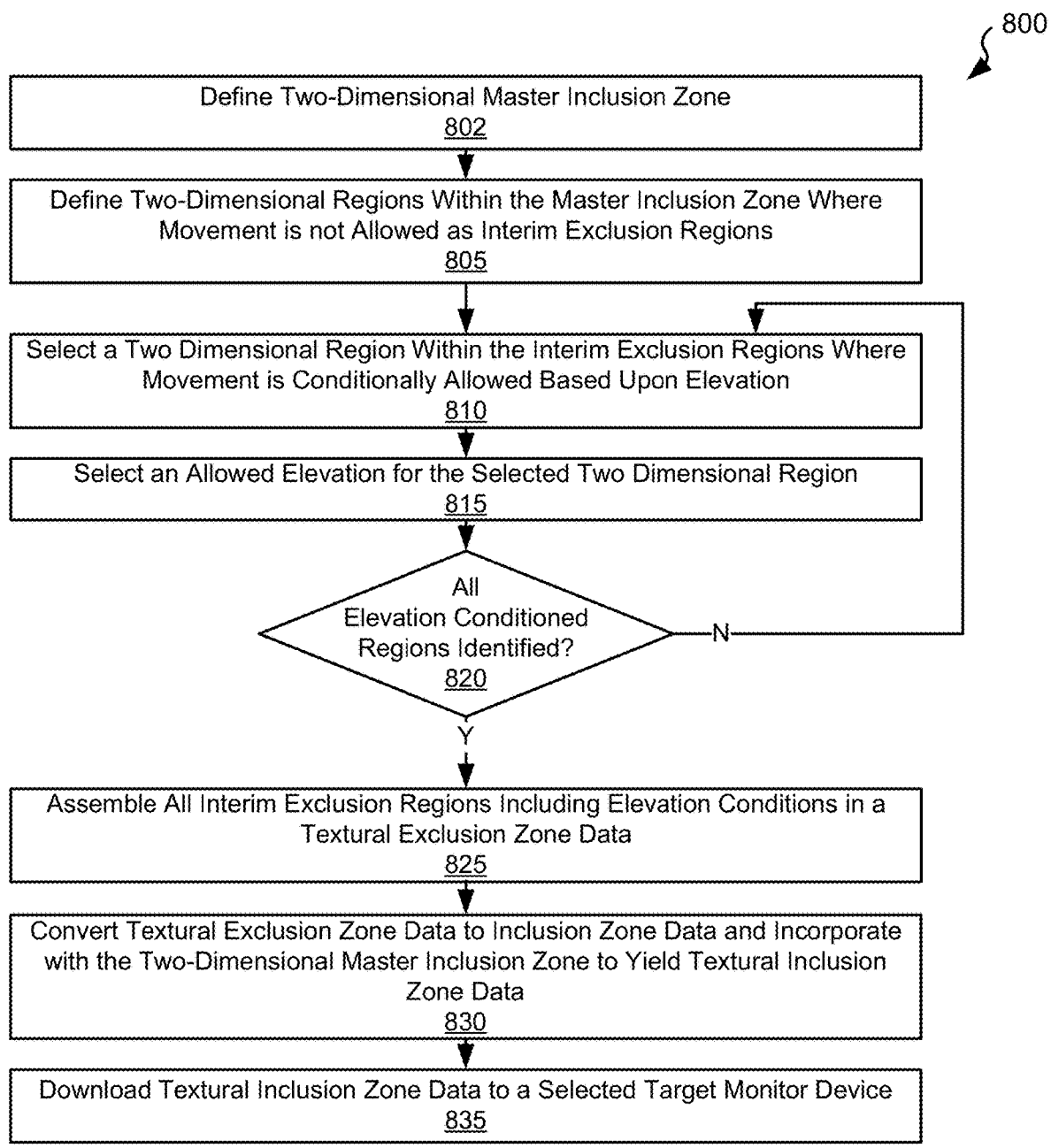
FIG. 8 is a flow diagram depicting a method for preparing textural inclusion zone data in accordance with some embodiments.

Turning to FIG. 8, a flow diagram 800 depicts a method for preparing textural exclusion zone data in accordance with some embodiments. Following flow diagram 800, a two-dimensional master inclusion zone is defined (block 802). Such a master inclusion zone identifies a two-dimensional area where an individual being monitored is expected to be during one or more defined time intervals. As examples, a two-dimensional master inclusion zone may be, but is not limited to, a city where the individual lives, a state in which the individual lives, a circle with a defined radius that is centered around a residence of the individual. Based upon the disclosure provided herein, one of ordinary skill in the art will recognize a variety of master inclusion zones that may be used in relation to different embodiments.

Two-dimensional regions within the master inclusion zone are defined where an individual is not allowed are defined as interim exclusion regions (block 805). This would include buildings where an individual is allowed to be, but where the individual is expected, for example, only be on certain floors of the building. An area within the interim exclusion regions is selected where movement is allowed conditionally based upon, for example, elevation (block 810). Thus, for example, where an individual is allowed on floors four and five a building, but the individual is not allowed on any other floor, a two dimensional region corresponding to the building is selected. An allowed elevation where the individual is allowed to be within the otherwise selected, non-allowed two-dimensional area is selected (block 815). Thus, using the example from the previous block, an elevation range corresponding to floors four and five is selected and attached to the selected, non-allowed two-dimensional area as a condition. It is then determined whether all conditions for the interim exclusion regions have been identified (block 820). Where other conditions need to be identified (block 820), the processes of blocks 810-820 are repeated.

Alternatively, where all of the conditions for the interim allowed regions have been identified (block 820), all of the interim exclusion regions are assembled with the previously identified conditions to yield textural exclusion zone data (block 825). This textural exclusion zone data is inverted to yield inclusion zone data, and incorporated with the master inclusion zone data to yield textural inclusion zone data (block 830). This textural inclusion zone data would identify all areas where an individual is allowed to travel. As such, it would identify the outer boundaries of the master inclusion zone data along with carve outs for areas within the aforementioned outer boundaries where the conditional and non-conditional exclusion zones exist. In this case, the conditional exclusion zones would be identified as conditional inclusion zones where an individual is expected to be within a defined elevation. The textural exclusion zone data is then downloaded to a selected target monitor device associated with a monitored individual (block 835). While not shown, grace periods for traversing exclusion zones may be defined, or a default grace period may be provided.

Figure 9:
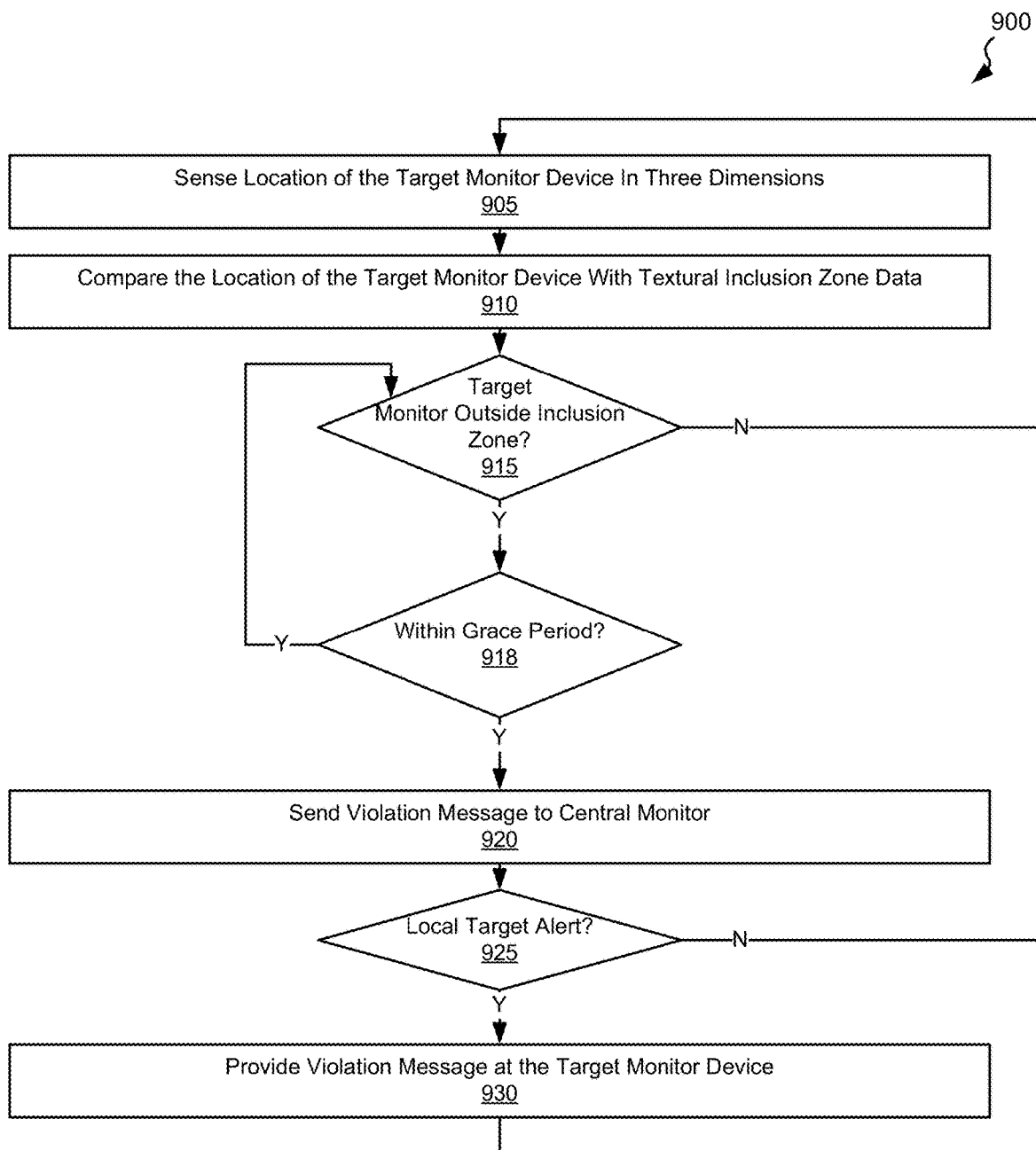
FIG. 9 is a flow diagram depicting a method for target monitoring based upon textural inclusion zone data in accordance with various embodiments.

Turning to FIG. 9, a flow diagram 900 depicts a method for target monitoring based upon textural inclusion zone data in accordance with various embodiments. Following flow diagram 900, the location of a target monitor device is sensed in three-dimensions (e.g., latitude, longitude, and elevation)(block 905). In some cases, this process involves receiving a signal from GNSS satellites (e.g., GNSS satellites 145, 146, 147) by a GNSS receiver (e.g., GNSS receiver 1022). In turn, the GNSS receiver calculates a location of the target monitor device. Alternatively, or in addition, location data is received from a beacon (e.g., beacon 1080). This location data is provided to a controller (e.g., controller 1027).

The sensed location of the target monitor device is compared with textural inclusion zone data (block 910). Such textural inclusion zone data identifies locations in three-dimensions where the individual is allowed to be. Where the comparison between the location of the target monitor device and the textural inclusion zone data indicates that the target monitor device is outside of an inclusion zone (block 915), it is determined whether the individual has been outside of the inclusion zone for more than a defined grace period (block 918). Where the individual has been outside of the inclusion zone for more than the defined grace period (block 918), a violation message is sent by the target monitor device to a central monitor station (block 920). This can include, for example, communicating an alert indicating the location of the target monitor device and the time of the violation. This message is formatted and sent via a cellular transceiver (e.g., cellular transceiver 1028) and/or via an Internet link (e.g., via a WiFi transceiver).

It is then determined whether the individual associated with the target monitor device is to be alerted of the violation (which would allow the individual to know that a monitoring person has also been alerted) (block 925). Where the individual associated with the target monitor device is to be alerted (block 925), a violation message is provided to the individual (block 930). This alert to the individual being monitored may be provided via, for example, a display and/or an audio output on the target monitor device. In some cases, the alert not only identifies the violation, but also indicates instructions that if followed by the individual associated with the target monitor device will cure the violation.

In conclusion, the present invention provides for novel systems, devices, and methods for monitoring individuals and/or assets. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for monitoring, the system comprising:
   a monitoring device including:
      a location determination circuit operable to determine a two-dimensional location of the monitoring device, and wherein the location determination circuit includes a receiver configured to receive an elevation of the monitoring device a beacon near the monitoring device;
      a processor;
      a computer readable medium including instructions executable by the processor to:
         compare a combination of the two-dimensional location and the elevation with textural zone data, wherein the textural zone data indicates at least one zone including a two-dimensional region and an elevation range associated with the two-dimensional region; and
         indicate a zone violation where the combination of the two-dimensional location and the elevation violates the textural zone data.

2. The system of claim 1, wherein indicating the zone violation includes transmitting an indication of the zone violation to a central monitor using a wireless transmitter.

3. The system of claim 1, wherein the location determination circuit includes at least one of: a GNSS receiver, a WiFi based location determination circuit, and a wireless radio triangulation location determination circuit.

4. The system of claim 1, wherein the elevation of the beacon corresponds to a floor number of a building, and wherein the two-dimensional region corresponds to a two-dimensional location of the building.

5. The system of claim 1, wherein the at least one zone is an exclusion zone, and wherein the zone violation is an exclusion zone violation where the elevation location is within the elevation range.

6. The system of claim 1, wherein the at least one zone is an inclusion zone, and wherein the zone violation is an inclusion zone violation where the elevation location is outside the elevation range.

7. The system of claim 1, wherein indicating the zone violation is done based upon a current comparison of the elevation of the monitoring device and a prior comparison of the two dimensional location of the monitoring device with the two dimensional region.

8. The system of claim 1, wherein the textural zone data is textural exclusion zone data, and wherein comparing the combination of the two-dimensional location and the elevation of the monitoring device with the textural exclusion zone data includes:
   comparing the two-dimensional location of the monitoring device with the two-dimensional region; and
   only where the two-dimensional location of the monitoring device is within the two-dimensional region, comparing the elevation of the monitoring device with the elevation range associated with the two-dimensional region.

9. The system of claim 1, wherein the monitoring device includes a wireless transmitter, and wherein the computer readable medium including instructions further executable by the processor to transmit an indication of the zone violation to a central monitor using the wireless transmitter.

10. The system of claim 9, wherein the wireless transmitter is selected from a group consisting of: a cellular transmitter, and a WiFi transmitter.

11. The system of claim 1, wherein the two-dimensional region corresponds to a two-dimensional location of the building, and wherein the elevation of the beacon is selected from a group consisting of: (a) a level above sea level, and (b) a level above a ground floor of the building.

12. A method for monitoring individual location, the method comprising:
   determining, by a monitoring device, a location of the monitoring device associated with an individual, wherein the location includes an elevation of the monitoring device, and wherein the elevation of the monitoring device is an elevation of a beacon near the monitoring device;
   accessing textural zone data, wherein the textural zone data indicates at least one zone, and wherein the at least one zone includes three dimensional location data; and
   comparing, by the monitoring device, at least the elevation of the monitoring device with the textural zone data; and
   indicating a zone violation where the elevation location is in violation of the at least one zone.

13. The method of claim 12, wherein the textural zone data is textural exclusion zone data, wherein the zone violation is an exclusion zone violation where the elevation location is within a defined range of an elevation level included as part of the three dimensional data location data.

14. The method of claim 12, wherein the textural zone data is textural inclusion zone data, wherein the zone violation is an inclusion zone violation where the elevation location is outside a defined range of an elevation level included as part of the three dimensional data location data.

15. The method of claim 12, wherein the location further includes a two-dimensional location of the monitoring device, wherein indicating the zone violation is done based upon a current comparison of the elevation of the monitoring device with an elevation level included as part of the three dimensional data location data and a prior comparison of the two dimensional location of the monitoring device with a two dimensional location included as part of the three dimensional data location data.

16. The method of claim 12, wherein the location further includes a two-dimensional location, and wherein comparing at least the elevation of the monitoring device with the textural zone data further includes comparing the two-dimensional location of the monitoring device with the textural zone data.

17. The method of claim 16, wherein the textural zone data is textural exclusion zone data, and wherein comparing the combination of the two-dimensional location and the elevation of the monitoring device with the textural exclusion zone data includes:
　　comparing the two-dimensional location of the monitoring device with a two-dimensional component of the textural exclusion zone data; and
　　only where the two-dimensional location of the monitoring device matches the two-dimensional component of the textural exclusion zone data, comparing the elevation of the monitoring device with an elevation associated with the two-dimensional component of the textural exclusion zone data.

18. The method of claim 16, wherein the textural zone data is textural exclusion zone data, and wherein comparing the combination of the two-dimensional location and the elevation with the textural exclusion zone data includes:
　　comparing the two-dimensional location of the monitoring device with a two-dimensional component of the textural exclusion zone data, wherein the two-dimensional component of the textural exclusion zone data is not associated with an elevation component; and
　　wherein the combination of the two-dimensional location and the elevation is within an exclusion zone defined within the textural exclusion zone data where there is a match between the two-dimensional location of the monitoring device and the two-dimensional component of the textural exclusion zone data regardless of the elevation of the monitoring device.

19. The method of claim 12, wherein the method further comprises:
　　determining, by the location determination circuit of the monitoring device, a two-dimensional location of the monitoring device.

20. The method of claim 19, wherein the location determination circuit includes at least one of: a global navigation satellite system (GNSS) receiver, a WiFi based location determination circuit, and a wireless radio triangulation location determination circuit.

21. The method of claim 12, the method further comprising:
　　receiving, by the monitoring device, a wireless communication from the beacon when the monitoring device is within a communication range of the beacon, and wherein the wireless communication includes the elevation of the beacon.

22. The method of claim 21, wherein the elevation of the beacon is selected from a group consisting of: (a) a level above sea level, and (b) a level above a ground floor of the building.

* * * * *